United States Patent [19]
Leung et al.

[11] Patent Number: 5,590,324
[45] Date of Patent: Dec. 31, 1996

[54] OPTIMIZATION OF SQL QUERIES USING UNIVERSAL QUANTIFIERS, SET INTERSECTION, AND MAX/MIN AGGREGATION IN THE PRESENCE OF NULLABLE COLUMNS

[75] Inventors: Ting Y. Leung; Mir H. Pirahesh; Michelle M. Jou; David E. Simmen, all of San Jose, Calif.

[73] Assignee: International Business Machines Corporation, Armonk, N.Y.

[21] Appl. No.: 384,925

[22] Filed: Feb. 7, 1995

[51] Int. Cl.$^6$ ........................................................ G06F 17/30
[52] U.S. Cl. ................................. 395/605; 364/DIG. 1; 364/282.1
[58] Field of Search ............................................. 395/600

[56] References Cited

U.S. PATENT DOCUMENTS

| | | | |
|---|---|---|---|
| 4,769,772 | 9/1988 | Dwyer | 395/600 |
| 4,829,427 | 5/1989 | Green . | |
| 5,001,477 | 3/1991 | Hicks et al. . | |
| 5,091,852 | 2/1992 | Tsunchida et al. . | |
| 5,367,675 | 11/1994 | Cheng et al. . | |
| 5,495,605 | 2/1996 | Cadot | 395/600 |
| 5,511,186 | 4/1996 | Carhart et al. | 395/600 |
| 5,519,859 | 5/1996 | Grace | 395/600 |

OTHER PUBLICATIONS

Selinger et al, "Access Path Selection in a Relational Database Management System", IBM Research Division, San Jose, CA (US), *ACM*, 1979, pp. 23–34.

Dayal et al., "An Extended Relational Algebra with Control Over Duplicate Elimination", Computer Corporation of America, Cambridge, MA, (US), ACM 1982, pp. 117–123.

Kim, Won, IBM Research "On Optimizing an SQL–Like Nested Query", *ACM Transactions on Database Systems*, vol. 7, No. 3, Sep. 1982, pp. 443–469.

Dayal, Umeshwar, "Of Nests and Trees: A Unified Approach to Processing Queries that Contain Nested Subqueries, Aggregates, and Quantifiers", Computer Corporation of America, Cambridge, MA (US), *Proceedings of the 13th VLDB Conference*, 1987, pp. 197–208.

Ganski et al., "Optimization of Nested SQL Queries Revisited", *ACM*, 1987, pp. 23–33.

Haas et al., "Extensible Query Processing in Starburst", IBM Almaden Research Center, San Jose, CA (US), ACM 1989, pp. 377–388.

Date, C. J. & Darwen, Hugh., "Relational Database Management" *Relational Database Writings 1989–1991*, Part II, pp. 133–154.

Pirahesh et al., "Extensible/Rule Based Query Rewrite Optimization in Starburst", IBM Almaden Research Center, San Jose, CA (US), *ACM Sigmond*, Jun. 1992, pp. 39–48.

Levy et al., "Query Optimization by Predicate Move–Around", Proceedings of the 20th VLDB Conference, Santiago, Chile, 1994, pp. 96–107.

(List continued on next page.)

*Primary Examiner*—Wayne Amsbury
*Attorney, Agent, or Firm*—Merchant, Gould, Smith, Edell, Welter & Schmidt

[57] ABSTRACT

A method and apparatus for optimizing SQL queries by propagating and exploiting column nullability. Column nullability is identified and propagated using a three-valued logic, wherein a column of a table can be identified nullability information is exploited to optimize query operations through transformations. In one aspect of the present invention, quantified predicates (such as ">ALL") are transformed into simple predicates involving singleton subqueries so that indexing can be exploited. In another aspect of the present invention, "is not null" predicates are generated and pushed for certain aggregate queries. In still another aspect of the present invention, intersect operations are transformed into joins. The end result is that the present invention can significantly enhance the performance of the queries.

38 Claims, 16 Drawing Sheets

OTHER PUBLICATIONS

Paulley et al., "Exploiting Uniqueness in Query Optimization", Department of computer Science, University of Waterloo, Ontario, Canada, *IEEE* 1994, pp. 68–79.

Lohman et al., "Research Report—Query Processing in R*", IBM Research Laboratory, San Jose, CA (US) IBM Research Division, Apr. 1984, pp. 1–33.

Yan et al, "Performing Broup–By before Join", Proc. The 10th International Conference on Data Engineering, 14–18 Feb. 94, pp. 89–100.

OPTIMIZATION OF SQL QUERIES USING UNIVERSAL QUANTIFIERS, SET INTERSECTION, AND MAX/MIN AGGREGATION IN THE PRESENCE OF NULLABLE COLUMNS

BACKGROUND OF THE INVENTION

1. Field of the Invention

This invention relates in general to database management systems performed by computers, and in particular, to the optimization of SQL queries in a relational database management system by propagating and exploiting column nullability.

2. Description of Related Art

Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

According to the SQL standard (i.e., ISO-ANSI Working Draft: Database Language SQL2 and SQL3; X3H2; ISO/IEC JTC1/SC21/WG3, 1993), column nullability for various set operations is based on the two-valued logic, i.e., a column is either nullable or non-nullable. In the SQL standard, null values can be stored only in nullable columns. For example, the following CREATE statement describes an employee table in the SQL standard:

CREATE TABLE EMPLOYEE (EMPNO INTEGER NOT NULL, LASTNAME CHAR (20), SALARY FLOAT)

In the above example, the column "EMPNO" is specified as "NOT NULL", i.e., the "EMPNO" column cannot contain any null values, whereas other columns may or may not contain null values. Consider a simple SELECT query performed against the employee table:

SELECT LASTNAME
FROM EMPLOYEE
WHERE EMPNO IS NULL

Since the EMPNO column cannot contain null values by definition, it can be verified at query compile time that the above query will return an empty result table. Without this simple and yet important optimization, the RDBMS software would have to fetch all tuples from the employee table and then apply the "IS NULL" predicate to the tuples. However, the "IS NULL" predicate is always false for the above query, since the "EMPNO" column was defined as "NOT NULL."

The above example illustrates the importance of exploiting column nullability information in query optimization. The exploitation of column nullability can mean a potentially huge saving in query execution time. However, determining if a column is nullable becomes less straightforward in presence of complex views or derived tables.

Some researchers have performed important work in this area, as reflected in the following publication: G. N. Paulley and Per-Ake Larson, "Exploiting Uniqueness in Query Optimization," *Proceedings of IEEE '94 International Conference on Data Engineering*, Houston, Tex., 1994, pp. 68–79. For example, this publication discusses the complexity of exploiting uniqueness in query optimization in the presence of null values. However, the current state-of-the-art in SQL query optimization has few solutions for optimizing query expressions by propagating and exploiting column nullability. Thus, there is a need in the art for improved methods of optimizing SQL queries by propagating and exploiting column nullability.

SUMMARY OF THE INVENTION

To overcome the limitations in the prior art described above, and to overcome other limitations that will become apparent upon reading and understanding the present specification, the present invention discloses a method and apparatus for optimizing SQL queries by propagating and exploiting column nullability.

One object of the present invention is to identify and propagate column nullability using a three-valued logic, wherein a column of a derived or base table can be null (when all data values in the column are null), non-null (when the column does not contain any null values), or nullable (when the column may or may not contain null values). The column nullability information is propagated through intermediate evaluations of SQL queries (e.g., selection, projection, join, intersection, except, union and group by operations).

Another object of the present invention is to exploit the column nullability information to optimize query operations through transformations. One aspect of the present invention transforms universal quantified predicates (such as ">ALL") into simple predicates involving singleton subqueries, so that indexing can be exploited. Another aspect of the present invention generates and pushes "is not null" predicates for certain aggregate queries. Still another aspect of the present invention transforms INTERSECT operations into joins.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

ENVIRONMENT

Figure 1:
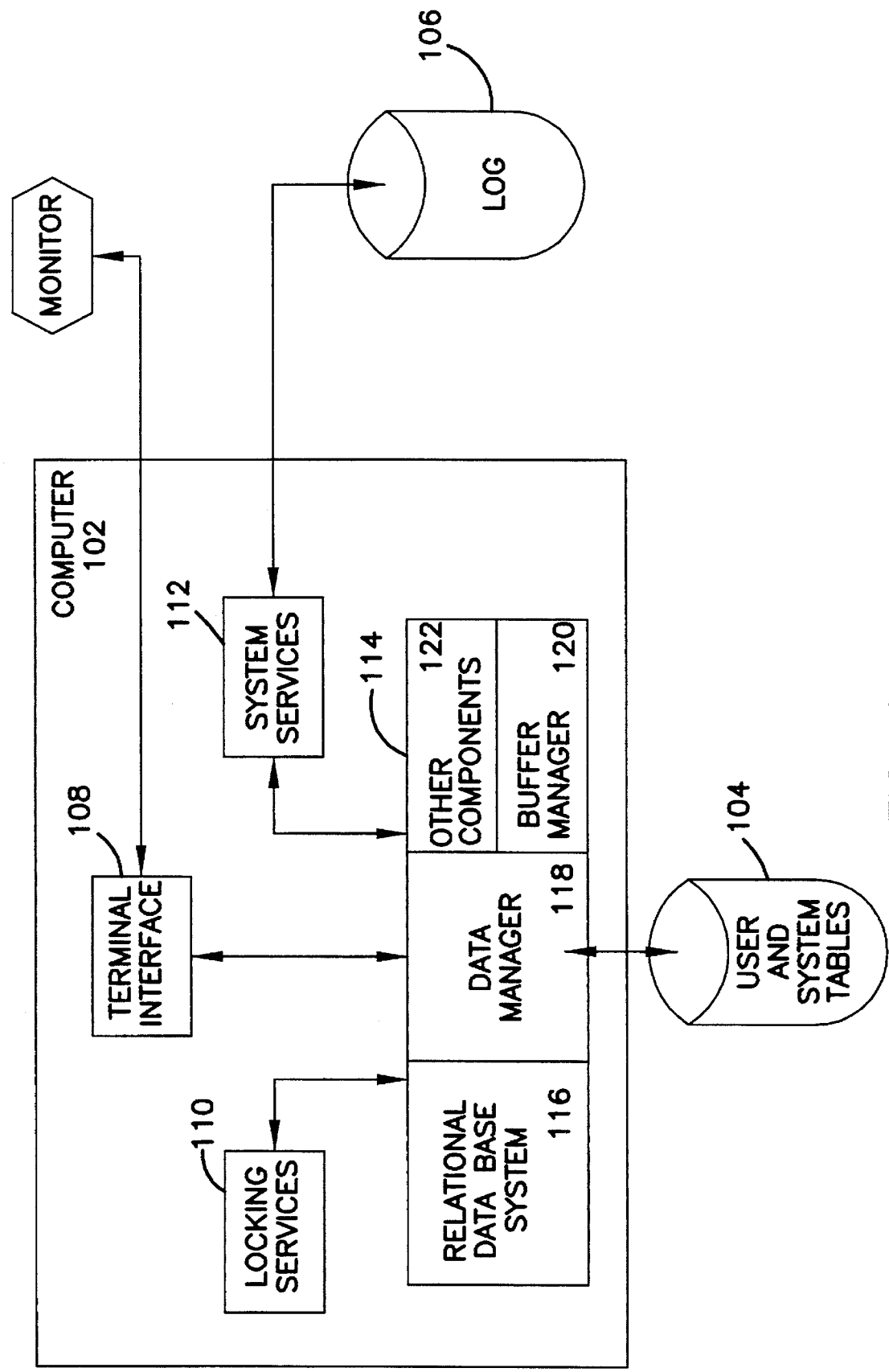
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

Figure 2:
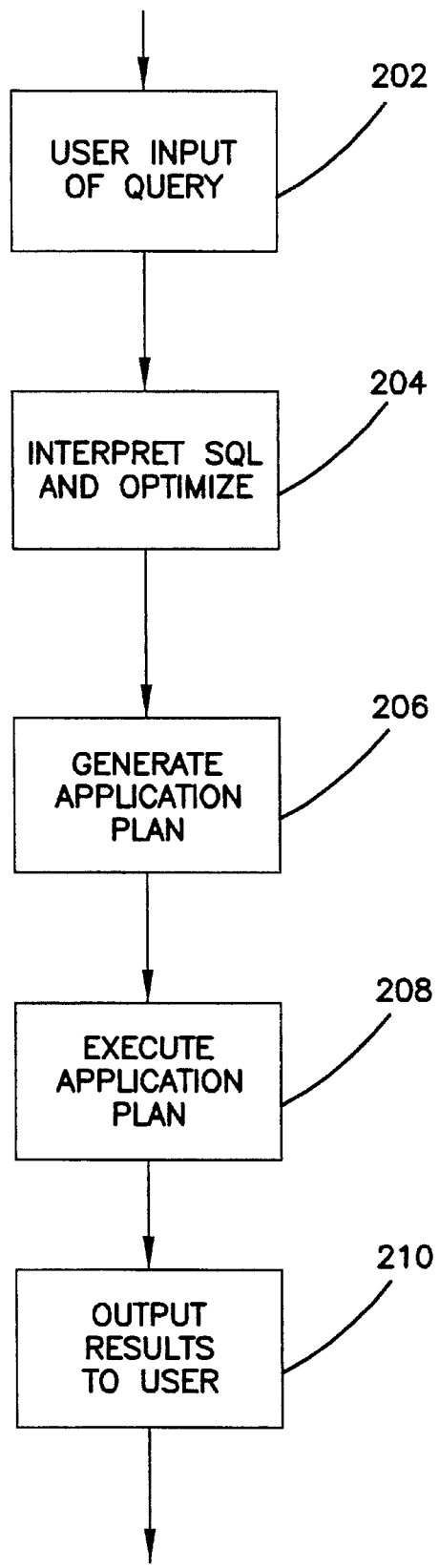
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
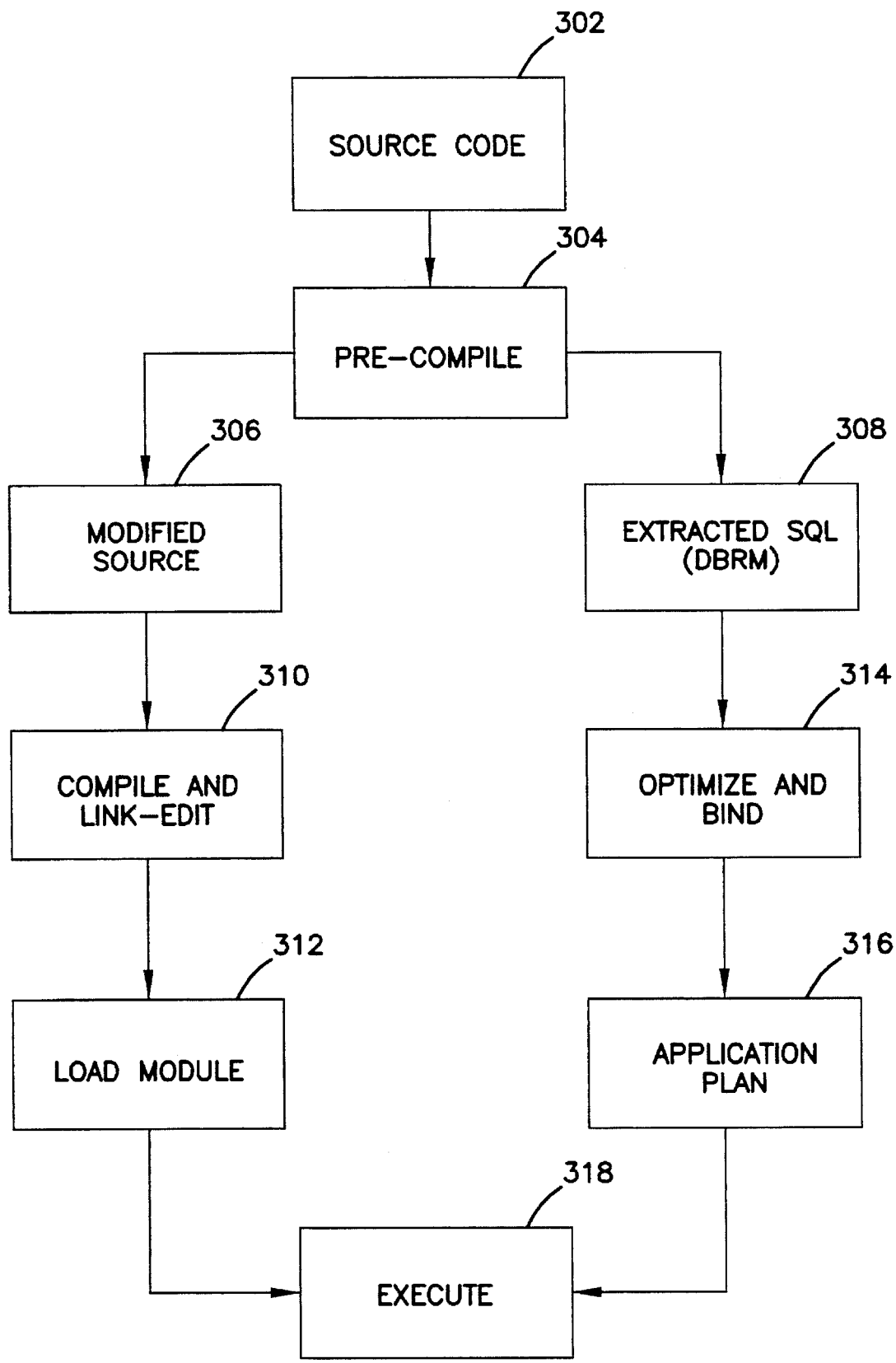
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

OPTIMIZATION

The present invention provides a technique for extending the identification of column nullability using a three-valued logic. Thus, a column of either a derived table or base table can be:

null, in that all data values in the column are null;

non-null, in that the column does not contain any null values or the column is not nullable; or nullable, in that the column may or may not contain null values.

The present invention also provides techniques for propagating column nullability information through various SQL operations, such as the SELECT, GROUP BY, UNION, INTERSECT and EXCEPT operations, and the restriction, projection and join operations provided by the SELECT operation. In addition, the present invention provides techniques for query transformation that exploit the propagated column nullability information.

Figure 4:
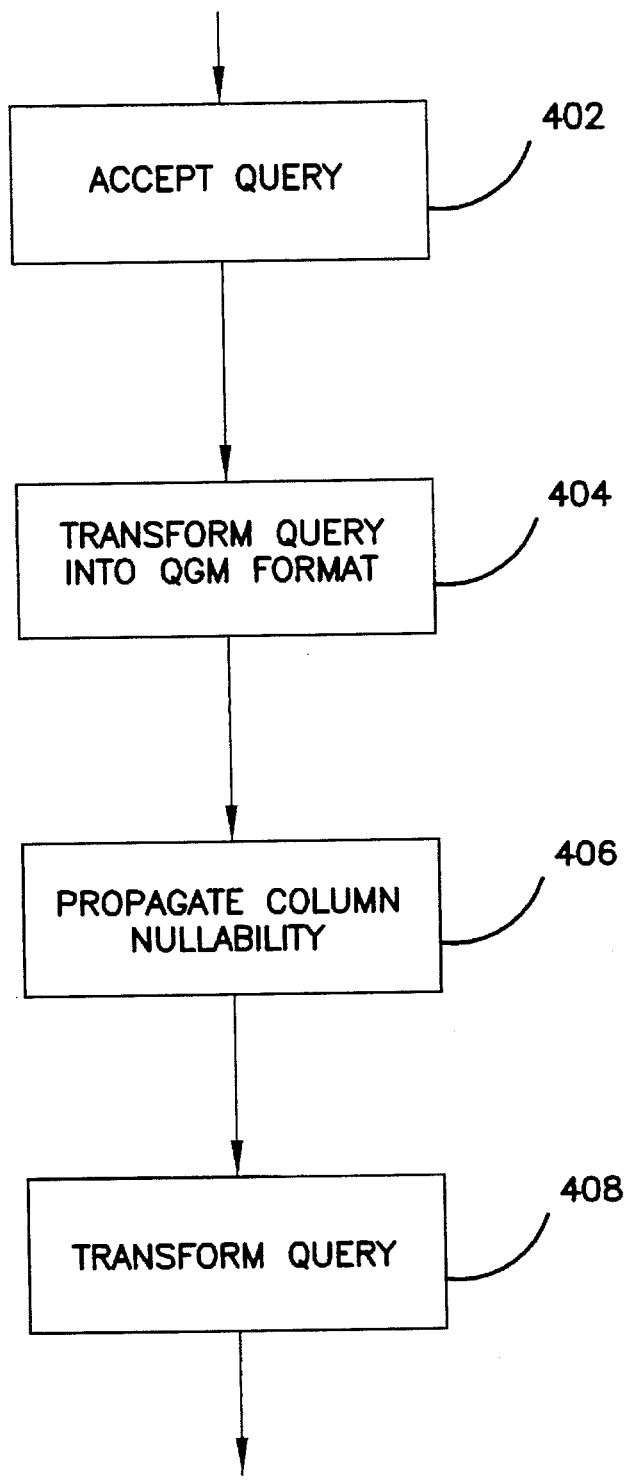
FIG. 4 is a flowchart illustrating the method of optimizing SQL queries according to the present invention.

FIG. 4 is a flowchart illustrating the method of optimizing SQL queries according to the present invention. Block 402 represents the acceptance of the SQL query. Block 404 represents the translation of the query into a Query Graph Model (QGM).

The QGM is well known in the art, and is more fully described in the following publications, both of which are incorporated by reference herein:

1. L. Haas, W. Chang, G. M. Lohman, J. McPherson, P. F. Wilms, G. Lapis, B. Lindsay, H. Pirahesh, M. Carey, and E. Shekita, "STARBURST Mid-flight: As the Dust Clears," *IEEE Transactions on Knowledge and Data Engineering*, March 1990, (hereinafter referred to as "[HAAS90]"); and 2. Hamid Pirahesh, Joseph Hellerstein, and Waqar Hasan, "Extensible/Rule Based Query Rewrite Optimization in STARBURST," *Proceedings of ACM SIGMOD '92 International Conference on Management of Data*, San Diego, Calif. 1992, (hereinafter referred to as "[PIRA92]") .

The QGM supports arbitrary table operations where the inputs are tables and outputs are tables, such as the SELECT, GROUP BY, UNION, INTERSECT and EXCEPT operations defined in the SQL standard, and the restriction, projection and join operations performed by the SELECT operation.

In QGM, each operation is represented in a data structure having a head and a body. The head describes the output table produced by the operation, and the body specifies the operation required to compute the output table. The head has a number of output columns such as those specified in the select list of a query. The specification of these columns includes column names, types, and output ordering information.

The head includes a Boolean attribute called distinct that indicates whether the associated table contains only distinct tuples ("head.distinct=IS"), or whether it may contain duplicates ("head.distinct=NONE"). For example, by definition, an intersect-distinct query produces no duplicates and thus the head.distinct is always equal to "IS". Each output column, which either returns results to the user or forms a derived column, may have an associated expression corresponding to expressions allowed in the select list of the query. These expressions are called head expressions.

For example, consider the following query:
SELECT C1, C2+C3
FROM T

The first output column is produced by a simple head expression which contains a column C1 from table T. The second output column is produced by a more complex head expression that comprises an addition of values from two columns.

Referring again to FIG. 4, block 406 represents the RDBMS software propagating column nullability for the QGM, as described in more detail in conjunctions with FIGS. 5, 6, 7, 8, 9A, 9B, 9C, and 10. Block 408 represents the RDBMS software transforming the query in the QGM, as described in more detail in conjunction with FIGS. 11, 12, 13, and 14. After query transformation, returns to block 204 in FIG. 2 or block 314 in FIG. 3 for subsequent processing steps, including the execution of the SQL query against the relational database and the output of the result table to the user.

PROPAGATION OF COLUMN NULLABILITY

The three-valued logic for identifying column nullability of the present invention provides more opportunities in terms of query transformation and query optimization. In the following sections, rules are presented for determining the nullability of an output column of an operation.

N-ARY UNION OPERATION

Figure 5:
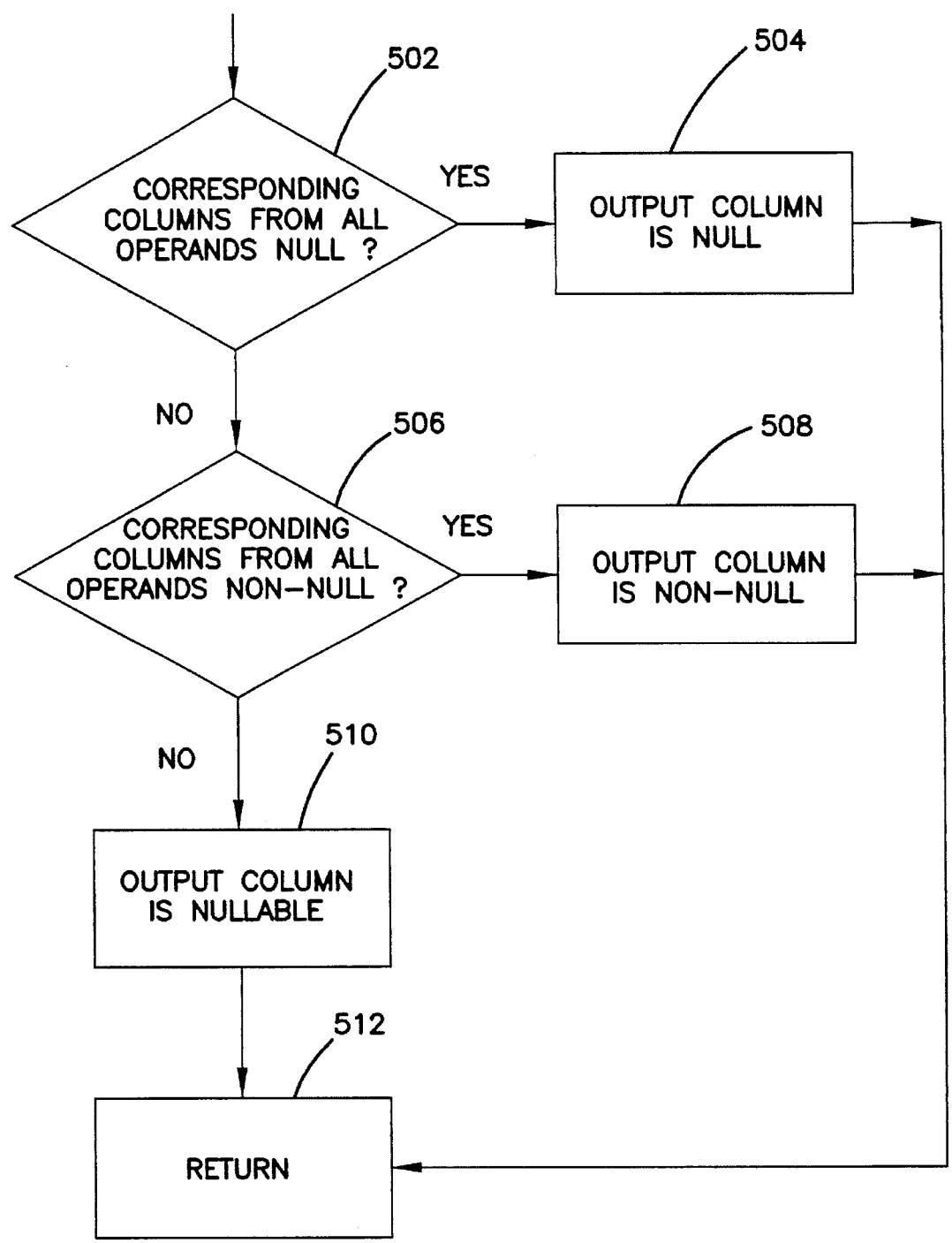
FIG. 5 is a flowchart that illustrates the steps required for propagating column nullability in an N-ary UNION operation according to the present invention.

FIG. 5 is a flowchart that illustrates the steps required for propagating column nullability in an N-ary UNION operation according to the present invention. The Nary UNION operation is the result of merging several binary UNION operations. For example, $UNION(T_1,(UNION(T_2,T_3)))$ is equivalent to $UNION(T_1,T_2,T_3)$, where $T_1$, $T_2$ and $T_3$ are base or derived tables.

Block 502 is a decision block that determines if the corresponding columns from all of the operands of a UNION operation are null. If so, then control is transferred to block 504, which identifies the output column as being null. Otherwise, control is transferred to block 506.

Block 506 is a decision block that determines if the corresponding columns from all the operands of the UNION operation are non-null. If so, then control is transferred to block 508, which identifies the output column as being non-null. Otherwise, control is transferred to block 510, which identifies the output column as being nullable, because at least one operand column is nullable. Block 512 ends the routine and returns to FIG. 4.

N-ARY INTERSECT OPERATION

Figure 6:
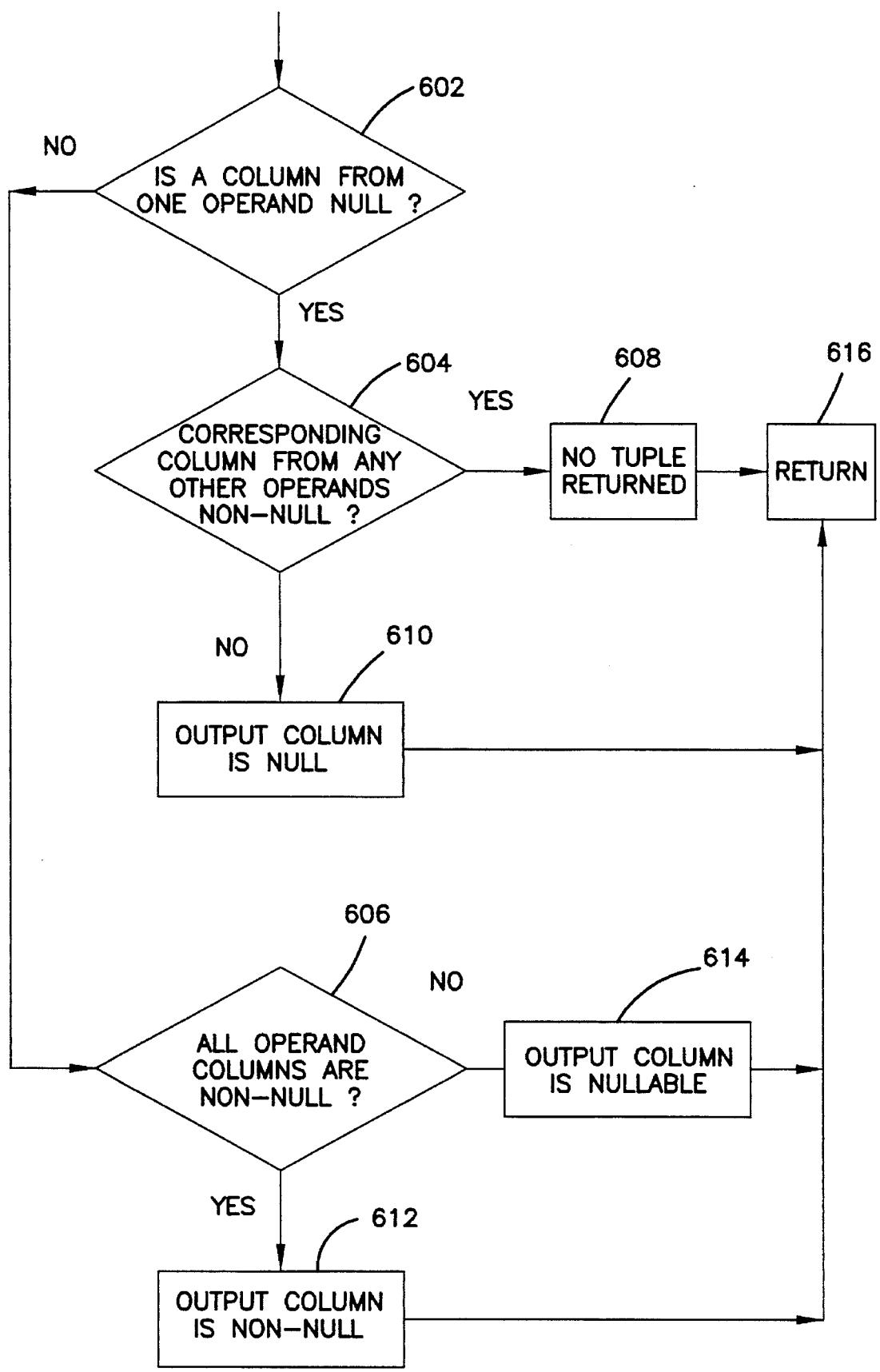
FIG. 6 is a flowchart that illustrates the steps required for propagating column nullability in an N-ary INTERSECT operation according to the present invention.

FIG. 6 is a flowchart that illustrates the steps required for propagating column nullability in an N-ary INTERSECT operation according to the present invention. The N-ary INTERSECT operation is the result of merging several binary INTERSECT operations. For example, $INTERSECT(T_1,(INTERSECT(T_2,T_3)))$ is equivalent to $INTERSECT(T_1,T_2,T_3)$, where $T_1$, $T_2$ and $T_3$ are base or derived tables.

Block 602 is a decision block that determines if a column from one operand of an INTERSECT operation is null. If so, then control is transferred to block 604. Otherwise, control is transferred to block 606, which identifies the case where no operand columns are null.

Block 604 is a decision block that determines if the corresponding column from any other operand of the INTERSECT operation is non-null. If so, then control is transferred to block 608, which identifies the case where there is no output tuple. Otherwise, control is transferred to block 610, which identifies the output column as being null.

Block 606 is a decision block that determines if the corresponding columns of all of the operands of the INTERSECT operation are non-null. If so, then control is transferred to block 612, which identifies the output column as being non-null. Otherwise, control is transferred to block 614, which identifies the output column as being nullable.

Block 616 ends the routine and returns to FIG. 4.

BINARY EXCEPT OPERATION

Figure 7:
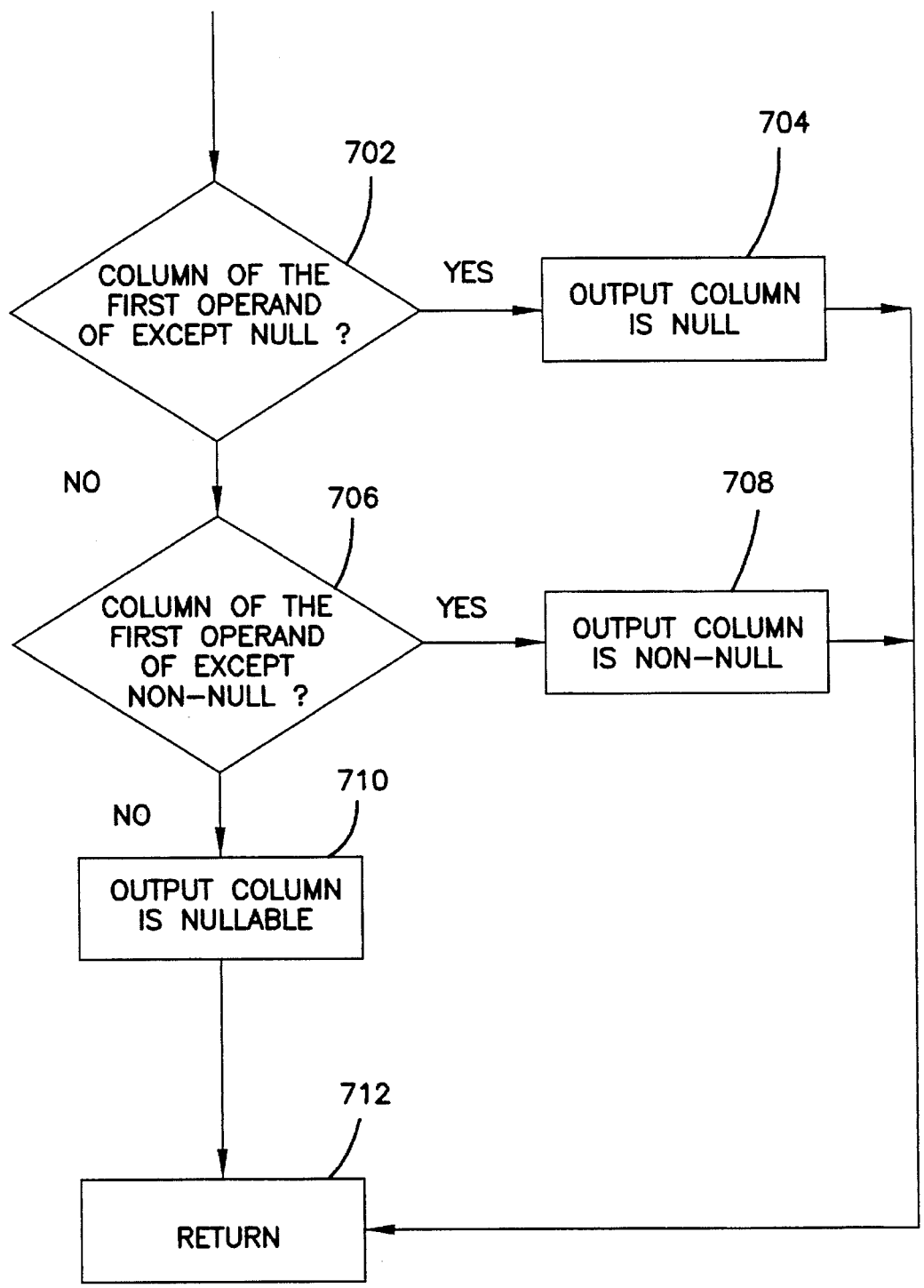
FIG. 7 is a flowchart that illustrates the steps required for propagating column nullability in a binary EXCEPT operation according to the present invention.

FIG. 7 is a flowchart that illustrates the steps required for propagating column nullability in a binary EXCEPT operation according to the present invention. The nullability of an output column of an EXCEPT operation is the same as the nullability of its first operand column.

Block 702 is a decision block that determines if the column of the first operand of the EXCEPT operation is null. If so, then control is transferred to block 704, which identifies the output column as being null. Otherwise, control is transferred to block 706.

Block 706 is a decision block that determines if the column of the first operand of the EXCEPT operation is non-null. If so, then control is transferred to block 708, which identifies the output column as being non-null. Otherwise, control is transferred to block 710, which identifies the output column as being nullable.

Block 712 ends the routine and returns to FIG. 4.

GROUP BY OPERATION

Figure 8:
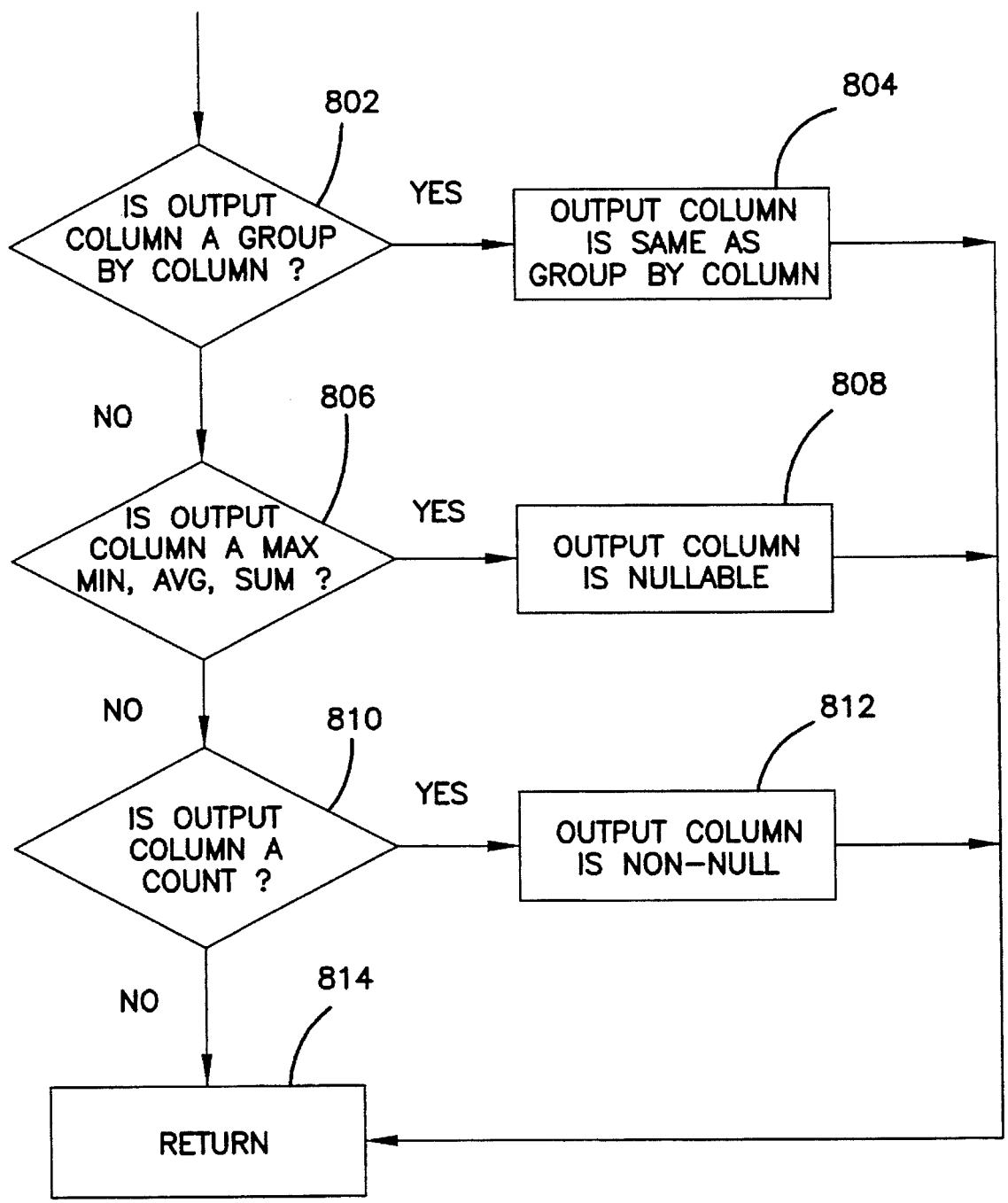
FIG. 8 is a flowchart that illustrates the steps required for propagating column nullability in a binary EXCEPT operation according to the present invention.

FIG. 8 is a flowchart that illustrates the steps required for propagating column nullability in a GROUP BY operation according to the present invention. Block 802 is a decision block that determines if the output column is a GROUP BY column. If so, then control is transferred to block 804, which identifies the output column as having the same nullability as the GROUP BY column. Otherwise, control is transferred to block 806.

Block 806 is a decision block that determines if the output column is one of the aggregation functions MAX, MIN, AVG, or SUM. If so, then control is transferred to block 808, which identifies the output column as being nullable. Otherwise, control is transferred to block 810.

Block 810 is a decision block that determines if the output column is the aggregation function COUNT. If so, then control is transferred to block 812, which identifies the output column as being non-null. Otherwise, control is transferred to block 814, which ends the routine and returns to FIG. 4.

SELECT OPERATION

Figure 9A:
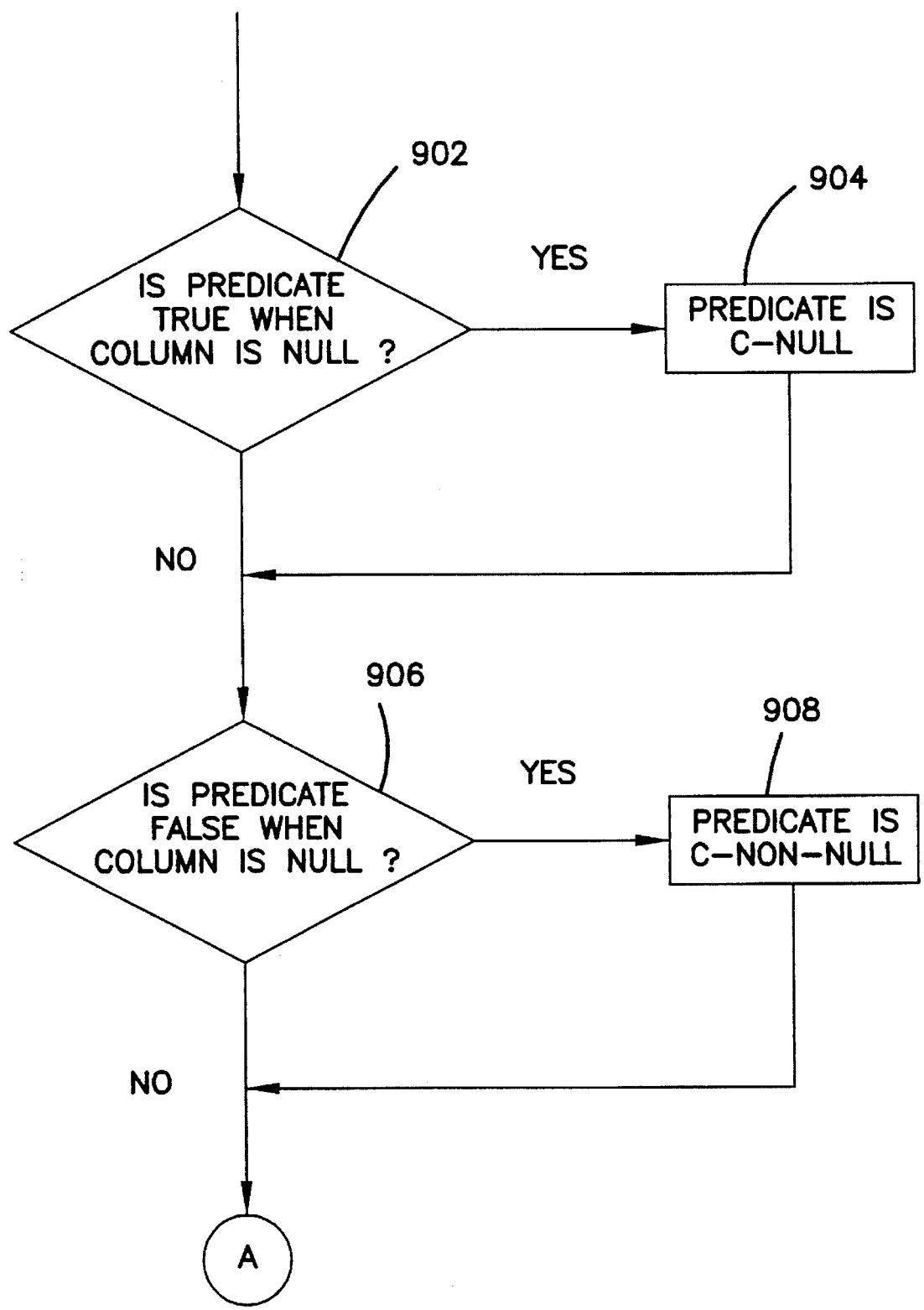
FIGS. 9A, 9B, and 9C together are a flowchart that illustrates the steps required for propagating column nullability in a SELECT operation according to the present invention.
Figure 9B:
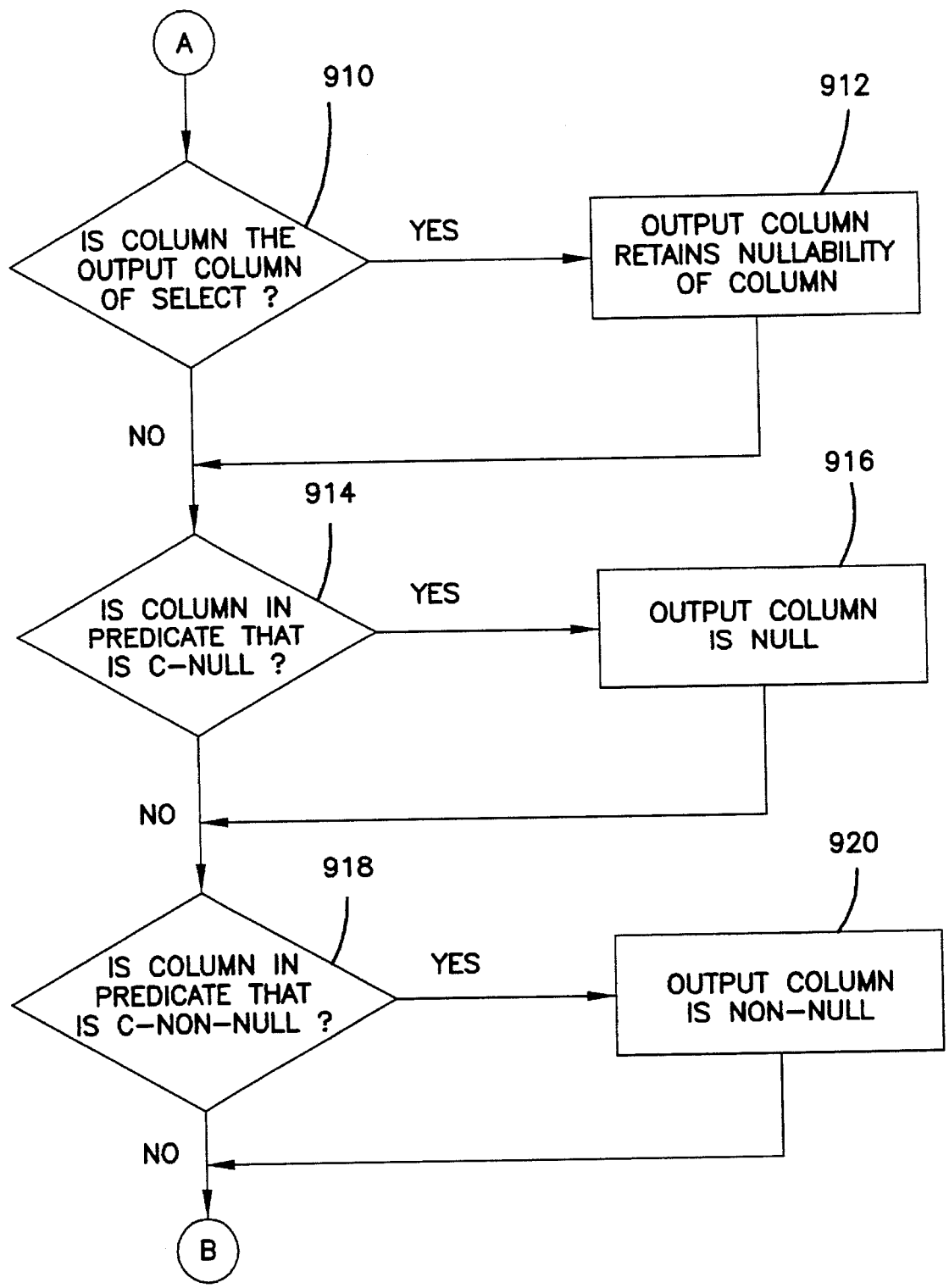
Figure 9C:
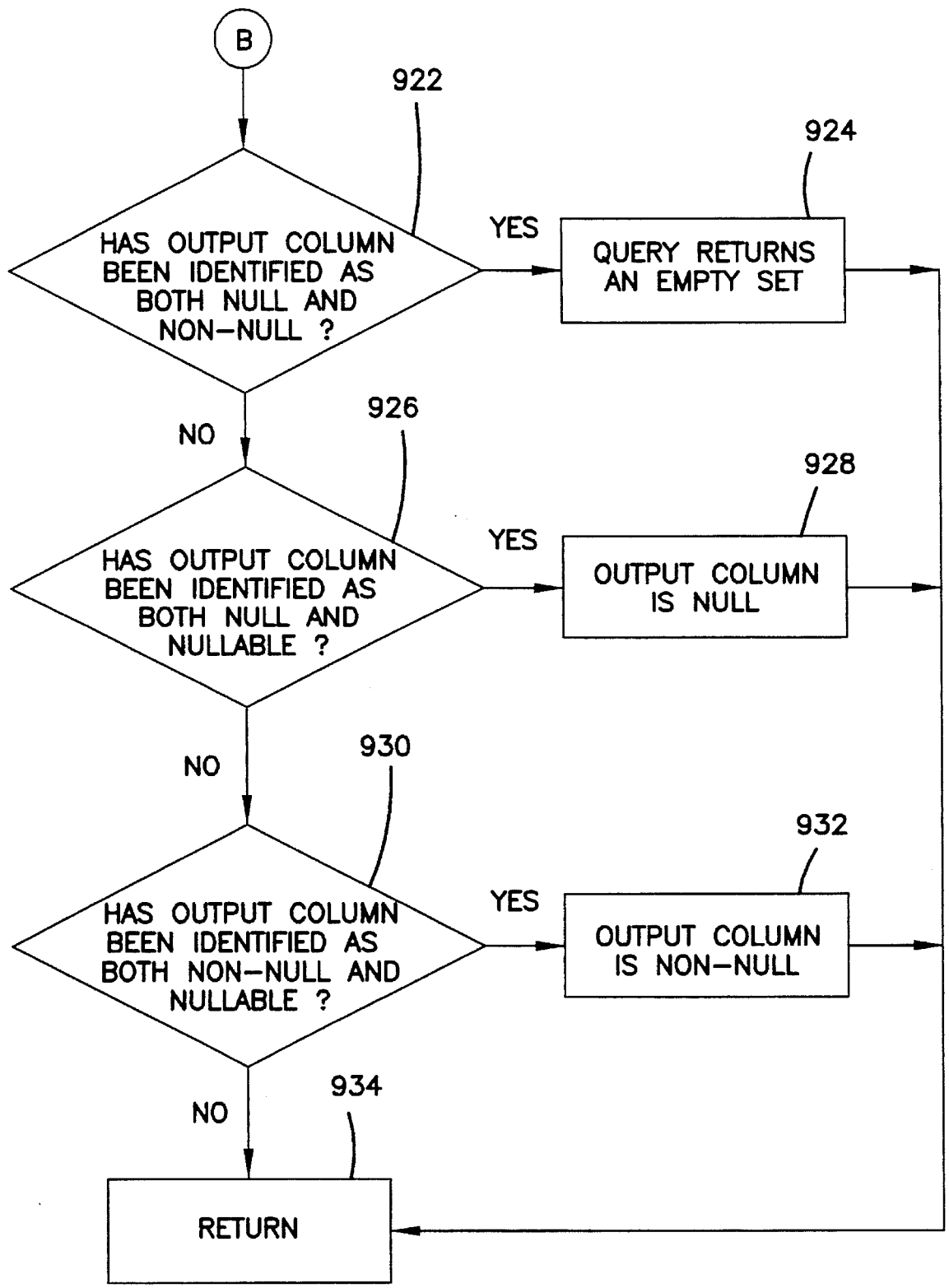

FIGS. 9A, 9B, and 9C together are a flowchart that illustrates the steps required for propagating column nullability in a SELECT operation according to the present invention. For a SELECT operation, the nullability of an output column depends heavily on its head expression.

In the simplest situation, if a head expression simply consists of a column C, then the output column retains the nullability of column C from its input derived table or base table. However, it is not always possible to determine the output column nullability by analyzing the head expression. For example, a CASE statement may produce a null value. Similarly, a user-defined function in the SELECT clause can produce null values. In such cases, nullable is taken as the default value.

FIG. 9A considers the situation where a column is referenced in a predicate in a WHERE clause. Block 902 is a decision block that determines if a column is referenced in a predicate such that the predicate is always true when the column has a null value. If so, control is transferred to block 904, which identifies the predicate as a "C-null" predicate. Otherwise control is transferred to block 906.

Block 906 is a decision block that determines if a column is referenced in a predicate such that the predicate is always false when the column has a null value. If so, control is transferred to block 908, which identifies the predicate as a "C-non-null" predicate. Otherwise, control is transferred to block 910.

FIG. 9B then considers the case when the head expression is only a simple column C. Block 910 is a decision block that determines if column C is an output column of the SELECT operation. If so, control is transferred to block 912, which identifies the output column as retaining the nullability of the column from its lower operation. Otherwise, control is transferred to block 914.

Block 914 is a decision block that determines if the column appears in a Boolean factor predicate that is C-null with respect to the column. If so, control is transferred to block 916, which identifies the output column as being null. Otherwise control is transferred to block 918.

Block 918 is a decision block that determines if the column appears in a Boolean factor predicate that is C-non-null with respect to the column. If so, control is transferred to block 920, which identifies the output column as being non-null. Otherwise control is transferred to block 922.

Note that applying these rules may lead to conflicting results. For example, if "COLUMN IS NULL AND COLUMN IS NOT NULL" appears in the WHERE clause, then the output column can be either null or non-null according to the above rules.

FIG. 9C describes the rules of precedence. Block 922 is a decision block that determines if the output column has been identified as null by one rule and non-null by another rule. If so, control is transferred to block 924, which identifies the query as returning an empty answer set. Otherwise control is transferred to block 926.

Block 926 is a decision block that determines if the output column has been identified as null by one rule and nullable by another rule. If so, control is transferred to block 928, which identifies the output column as being null. Otherwise control is transferred to block 930.

Block 930 is a decision block that determines if the output column has been identified as non-null by one rule and nullable by another rule. If so, control is transferred to block 932, which identifies the output column as being non-null. Otherwise control is transferred to block 934, which ends the routine and returns to FIG. 4.

QUERY OPTIMIZATION USING COLUMN NULLABILITY INFORMATION

In this section, a number of query optimization techniques are provided that exploit the propagated column nullability information of the intermediate query evaluation.

PREDICATE SIMPLIFICATION

Predicates like "IS NULL" and "IS NOT NULL" are very common. The following rules are provided for simplifying predicates in the WHERE clause:

1. If a column C is null, then "C IS NOT NULL" is equivalent to FALSE and "C IS NULL" is equivalent to TRUE.

2. If a column C is non-null, then "C IS NOT NULL" is equivalent to TRUE and "C IS NULL" is equivalent to FALSE.

Note that the first rule is not possible without using the three-valued logic of column nullability according to the present invention.

UNIVERSAL QUANTIFIED PREDICATE TRANSFORMATION

Figure 10:
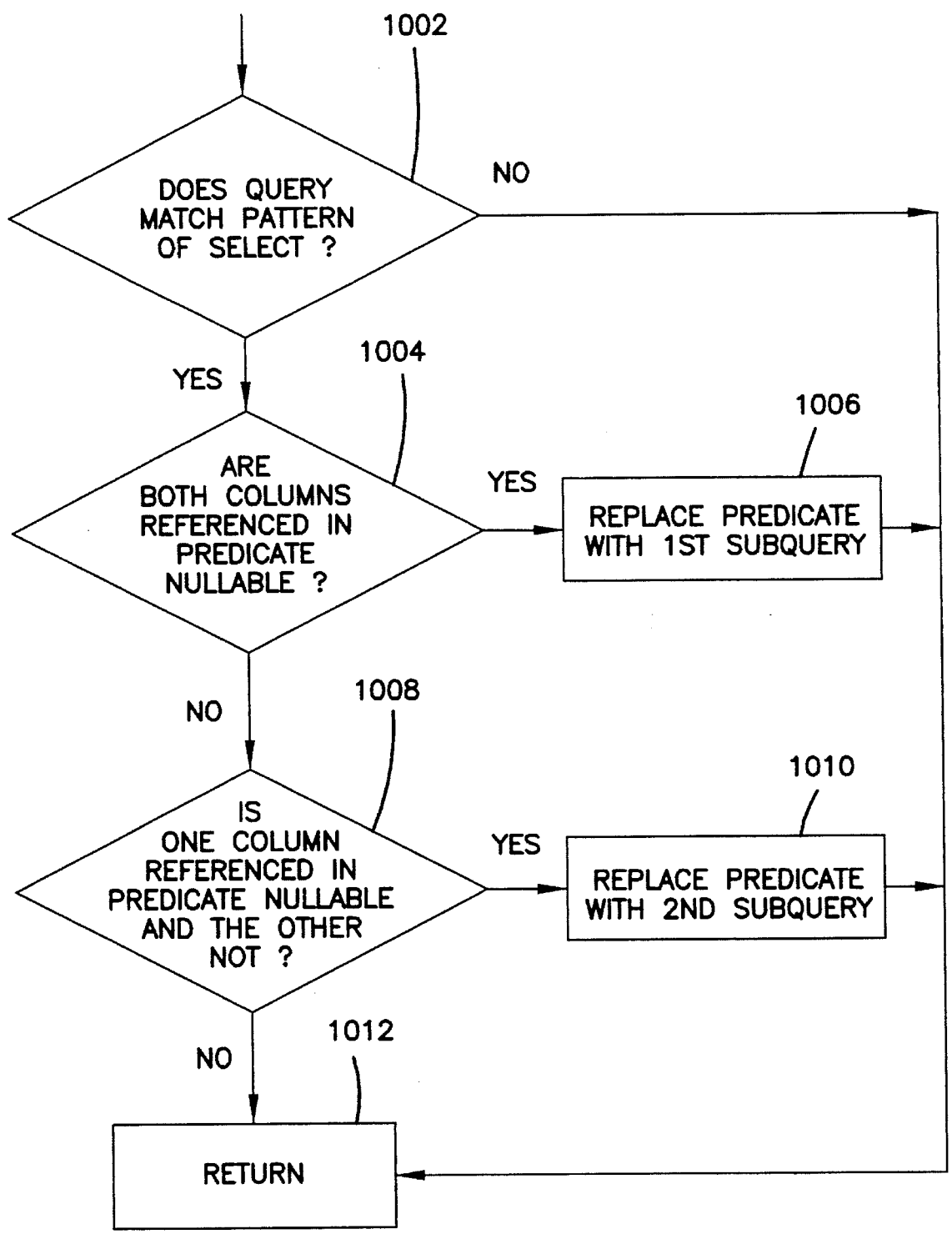
FIG. 10 is a flowchart that illustrates the steps required for transforming quantified predicate queries according to the present invention.

FIG. 10 is a flowchart that illustrates the steps required for transforming universal quantified predicate queries according to the present invention. Universal quantified predicates can be found in queries that take the form "C1 RELOP ALL (SELECT C2 FROM . . .)", wherein RELOP is a relational operator selected from the group comprising (=,>,<,<=,>=), and C1 and C2 represent columns of derived or base tables.

Block 1002 is a decision block that determines if the query matches a particular pattern, i.e., a pattern that contains a particular quantified predicate in a Boolean factor. If so, then control is transferred to block 1004, which is a decision block that determines if the columns referenced in the quantified predicate are nullable. If so, then control is transferred to block 1006, which replaces the quantified predicate with a first simple predicate involving a singleton subquery. Otherwise, control is transferred to block 1008, which is a decision block that determines if the column returned from the subquery portion of the quantified predicate is nullable, but the other column referenced in the quantified predicate is not. If so, then control is transferred to block 1010, which replaces the quantified predicate with a second simple predicate involving a singleton subquery. Otherwise, block 1012 ends the routine and returns to FIG. 4.

The above steps are generalized for several different types of quantified predicates. The different forms of the quantified predicates, and their associated first and second simple predicates are described in more detail below.

CASE 1: >ALL

For the case of transforming the quantified predicate ">ALL", the optimizer looks for a query of the general form:
SELECT S.*
FROM S
WHERE S.C1>ALL (SELECT T.C2 FROM T)

When both columns S.C1 and T.C2 are nullable, the quantified predicate can be transformed into a first simple predicate involving a singleton subquery of the form:

In the above expression, the "−infinity" denotes the minimal value in the domain of T.C2. The objective of this transformation is that the derived table returns at most one tuple and if there is an index on S.C1, "index or-ing" can be exploited by the optimizer to access the table S. The following discussion describes why such a query transformation can be performed. First, the semantics of the quantified predicate ">all" in presence of null values and empty subquery is explained. If the subquery returns an empty set, then the quantified predicate is true (even if the value of S.C1 is null). If the subquery returns any null value, then the quantified predicate is false. Finally, if the subquery returns one or more values (without any null), then the quantified predicate is true if S.C1 is greater than all values returned from the subquery; otherwise, it is false. Note, that if S.C1 is a null value, then the predicate is false.

Intuitively, the predicate could have been simplified to just comparing S.C1 and the maximal value of the subquery result. However, the presence of null values and empty subquery result leads to a more complicated query transformation. To detect this information, a derived table (denoted as DT) is created that is the result of evaluation of the subquery.

In the above example, the derived table has two columns. The first column (the Y column) computes the maximal value of the subquery result, which is the primary value for comparison purposes. The second column (the Z column) determines if there is any null value and empty result. The second column has three possible values:

null, if the subquery returns an empty set;

1, if there exists a null value in the subquery result; and 0, if there is no null value in the subquery result and there is one or more non-null values.

Furthermore, this derived table returns only a single tuple. The present invention uses these three possible values to transform the quantified predicate into a better form of predicate, so that indexing can be exploited by the optimizer to access the table S via column S.C1. In this case, then index OR-ing technique may be used.

Now, suppose that column T.C2 is nullable but S.C1 is non-null. Then, the above quantified predicate can be transformed into a second simple predicate involving a singleton subquery of the form:

```
SELECT S.*
FROM S, (SELECT
        MAX(C2) AS Y,
        MAX(CASE WHEN C2 IS NULL THEN 1 ELSE 0 END) AS Z
        FROM T) AS DT
WHERE ( (S.C1 IS NULL AND Z IS NULL)
        OR
        S.C1 >= (CASE WHEN Z IS NULL THEN −INFINITY
                      WHEN Z=0     THEN Y
                                   ELSE NULL
                 END))
        AND
        (S.C1 > Y OR Z IS NULL)
```

```
SELECT S.*
FROM S, (SELECT
        MAX(C2) AS Y,
        MAX(CASE WHEN C2 IS NULL THEN 1 ELSE 0 END) AS Z
        FROM T) AS DT
WHERE (S.C1 > = (CASE WHEN Z IS NULL THEN -INFINITY
                    WHEN Z=0      THEN Y
                                  ELSE NULL
             END))
    AND
    (S.C1 > Y OR Z IS NULL)
```

The difference of this transformed query and the previous one is that "index or-ing" is not needed, because the ">=" predicate is a good range predicate for an index scan on S.C1.

CASE 2: >=ALL

For the case of transforming the quantified predicate ">=ALL", the optimizer looks for a query of the general form:
SELECT S.*
FROM S
WHERE S.C1>=ALL (SELECT T.C2 FROM T)

When both columns S.C1 and T.C2 are nullable, the quantified predicate can be transformed into a first simple predicate involving a singleton subquery of the form:

```
SELECT S.*
FROM S, (SELECT
        MAX(C2) AS Y,
        MAX(CASE WHEN C2 IS NULL THEN 1 ELSE 0 END) AS Z
        FROM T) AS DT
WHERE ( (S.C1 IS NULL AND Z IS NULL)
    OR
    S.C1 >= (CASE WHEN Z IS NULL THEN -INFINITY
                 WHEN Z=0      THEN Y
                               ELSE NULL
             END))
```

In the above expression, the "-infinity" denotes the minimal value in the domain of T.C2. As in case 1 above, the objective of this transformation is that the derived table returns one tuple and if there is an index on S.C1, index or-ing can be exploited by the optimizer to access the table S.

Now, suppose that column T.C2 is nullable but S.C1 is non-null. The above quantified predicate can be transformed into a second simple predicate involving a singleton subquery:

```
SELECT S.*
FROM S, (SELECT
        MAX(C2) AS Y,
        MAX(CASE WHEN C2 IS NULL THEN 1 ELSE 0 END) AS Z
        FROM T) AS DT
WHERE (S.C1 >= (CASE WHEN Z IS NULL THEN -INFINITY
                    WHEN Z=0      THEN Y
                                  ELSE NULL
             END))
```

SELECT S.*
FROM S
WHERE S.C1<ALL (SELECT T.C2 FROM T)

When both columns S.C1 and T.C2 are nullable, the quantified predicate can be transformed into a first simple predicate involving a singleton subquery of the form:

CASE 3: <ALL

For the case of transforming the quantified predicate "<ALL", the optimizer looks for a query of the general form:

```
SELECT S.*
FROM S, (SELECT
        MIN(C2) AS Y,
        MAX(CASE WHEN C2 IS NULL THEN 1 ELSE 0 END) AS Z
        FROM T) AS DT
WHERE ( (S.C1 IS NULL AND Z IS NULL)
      OR
      S.C1 <= (CASE WHEN Z IS NULL THEN +INFINITY
                    WHEN Z=0      THEN Y
                                  ELSE NULL
               END))
      AND
      (S.C1 < Y OR Z IS NULL)
```

In the above expression, the "+infinity" denotes the maximal value in the domain of T.C2. As in the case 1, the objective of this transformation is that the derived table returns one tuple and if there is an index on S.C1, index or-ing can be exploited by the optimizer to access the table S.

Now, suppose that column T.C2 is nullable but S.C1 is non-null. The above quantified predicate can be transformed into a second simple predicate involving a singleton subquery of the form:

Now, suppose that column T.C2 is nullable, but S.C1 is non-null. The above quantified predicate can be transformed into a second simple predicate involving a singleton subquery of the form:

```
SELECT S.*
FROM S, (SELECT
        MIN(C2) AS Y,
        MAX(CASE WHEN C2 IS NULL THEN 1 ELSE 0 END) AS Z
        FROM T) AS DT
WHERE (S.C1 <= (CASE WHEN Z IS NULL THEN +INFINITY
                     WHEN Z=0      THEN Y
                                   ELSE NULL
                END))
      AND
      (S.C1 < Y OR Z IS NULL)
```

CASE 4: <=ALL

For the case of transforming the quantified predicate "<=ALL", the optimizer looks for a query of the general form:
SELECT S.*
FROM S
WHERE S.C1<=ALL (SELECT T.C2 FROM T)

When both columns S.C1 and T.C2 are nullable, the quantified predicate can be transformed into a first simple predicate involving a singleton subquery of the form:

```
SELECT S.*
FROM S, (SELECT
        MIN(C2) AS Y,
        MAX(CASE WHEN C2 IS NULL THEN 1 ELSE 0 END) AS Z
        FROM T) AS DT
WHERE ( (S.C1 IS NULL AND Z IS NULL)
      OR
      S.C1 <= (CASE WHEN Z IS NULL THEN +INFINITY
                    WHEN Z=0      THEN Y
                                  ELSE NULL
               END))
```

In the above expression, the "+infinity" denotes the maximal value in the domain of T.C2. As in case 1, the objective of this transformation is that the derived table returns one tuple and if there is an index on S.C1, index or-ing can be exploited by the optimizer to access the table S.

```
SELECT S.*
FROM S, (SELECT
        MIN(C2) AS Y,
        MAX(CASE WHEN C2 IS NULL THEN 1 ELSE 0 END) AS Z
        FROM T) AS DT
WHERE (S.C1 <= (CASE WHEN Z IS NULL THEN +INFINITY
                WHEN Z=0       THEN Y
                               ELSE NULL
        END))
```

CASE 5: =ALL

For the case of transforming the quantified predicate "=ALL", the optimizer looks for a query of the general form:
SELECT S.*
FROM S
WHERE S.C1=ALL (SELECT T.C2 FROM T)

When both columns S.C1 and T.C2 are nullable, the quantified predicate can be transformed into a first simple predicate involving a singleton subquery of the form:

```
SELECT S.*
FROM S, (SELECT
        MIN(C2) AS X,
        MAX(C2) AS Y,
        MAX(CASE WHEN C2 IS NULL THEN 1 ELSE 0 END) AS Z
        FROM T) AS DT
WHERE ( (S.C1 IS NULL AND Z IS NULL)
        OR
        S.C1 <= (CASE WHEN Z IS NULL THEN +INFINITY
                      WHEN X=Y AND Z=0 THEN X
                                       ELSE NULL
                END))
        AND
        ((S.C1 IS NULL AND Z IS NULL)
         OR
         S.C1 >= (CASE WHEN Z IS NULL     THEN -INFINITY
                       WHEN X=Y AND Z=0 THEN Y
                                        ELSE NULL
                 END))
```

In the above expression, "–infinity" and "+infinity" denote the minimal and maximal value in the domain of T.C2 respectively.

Now, suppose that column T.C2 is nullable but S.C1 is non-null. The above quantified predicate can be transformed into a second simple predicate involving a singleton subquery of the form:

```
SELECT S.*
FROM S, (SELECT
        MIN(C2) AS X,
        MAX(C2) AS Y,
        FROM T) AS DT
WHERE ((S.C1 IS NULL AND Y IS NULL)
        OR
        S.C1 <= (CASE WHEN X=Y AND Y IS NULL
                              THEN +INFINITY
                      WHEN X=Y
                              THEN X
                              ELSE NULL
                END))
        AND
        ((S.C1 IS NULL AND Z IS NULL)
         OR
         S.C1 >= (CASE WHEN X=Z AND Y IS NULL
                              THEN -INFINITY
                       WHEN X=Y
                              THEN Y
                              ELSE NULL
                 END))
```

From these transformations, it can be seen that determining column nullability becomes increasing more important as it could simplify query transformations.

"IS NOT NULL" PREDICATE PUSHDOWN

Consider a table T and a descending index on one of its column C:
CREATE TABLE T (. . . , C INTEGER, . . .)
CREATE INDEX I on T(C DESC)

Suppose the following query, which returns the maximal value of column C, is executed against the table T:
SELECT MAX (C)
FROM T Note that the MAX(C) function in the query returns the maximal non-null value. Suppose that null has the highest collating sequence value and the optimizer selects a plan that goes through the index I, wherein the execution sequence is that the index I is scanned in descending order, each data value is fetched, and each fetched data value is tested to determine whether it is a null value, and then the fetch-and-test procedure is repeated until the first non-null value is found. The above repeated procedure could be avoided if the information that null values would not contribute to the query answer set was available.

Now, consider the same query in an equivalent form:
SELECT MAX (C)
FROM T
WHERE C IS NOT NULL The difference is that an additional predicate "C IS NOT NULL" is introduced. With this predicate and the column nullability propagation methods, it can be determined that the input to the group by operation is non-null. Thus, the optimizer can generate a plan that accesses the index I and applies this predicate while accessing the index, as described in Patricia G. Selinger, D. Chamberlin, M. Astrahan, Raymond Lorie, and T. Price, "Access Path Selection in a Relational Database Management System," *Proceedings of ACM SIGMOD '79 International Conference on Management of Data*, 1979, pp. 23–34, and incorporated by reference herein. The effect is that only the first qualified non-null record is returned, and hence the fetch-and-test procedure is avoided.

This is called the one-fetch property. In general, the more null values that are stored in the column C, the faster the query is executed, because all null values are skipped during the index scan. Moreover, the above observation leads to some valuable query transformations, as described in more detail below.

Figure 11:
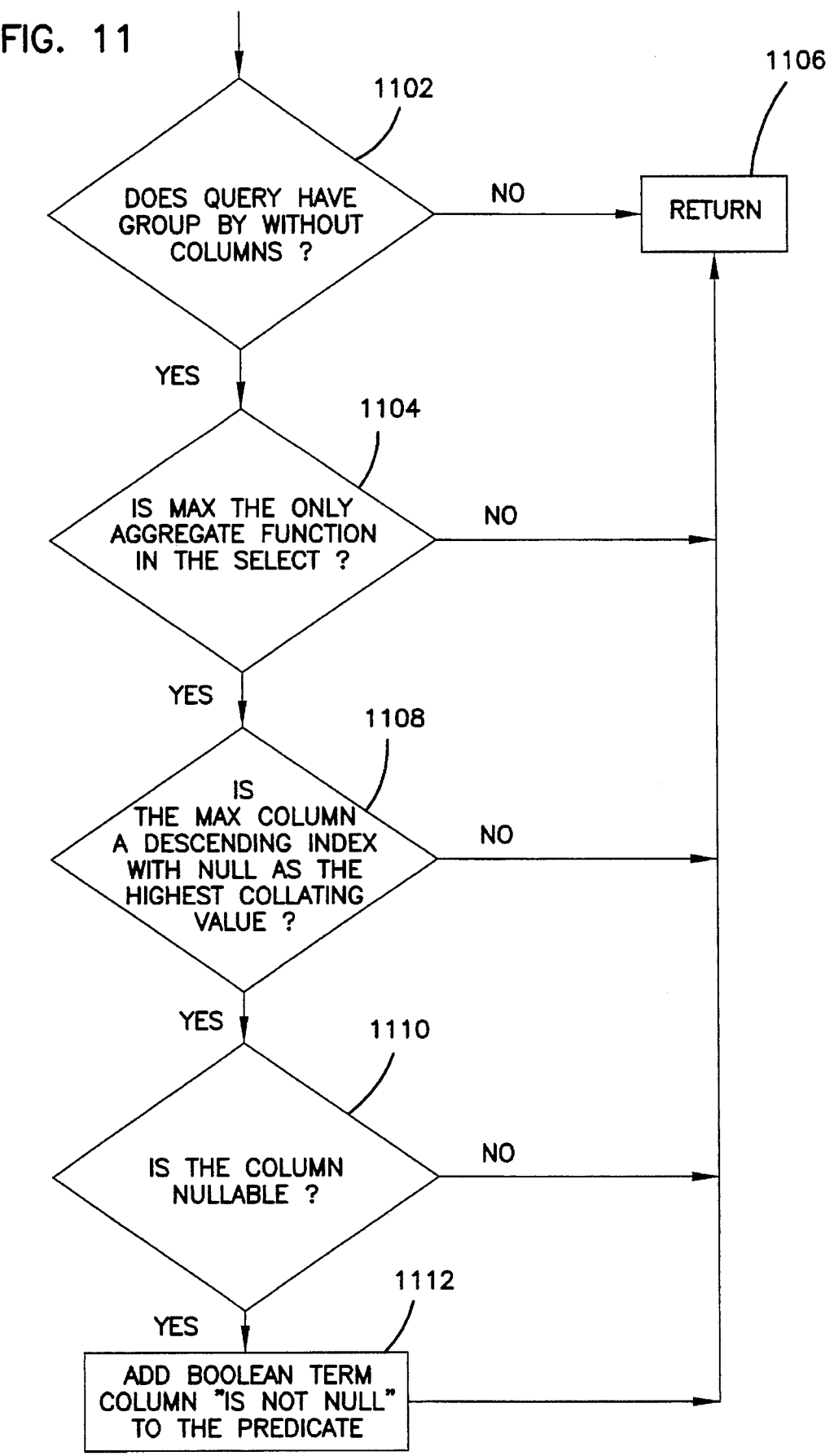
FIG. 11 is a flowchart that illustrates the steps required for transforming one-fetch queries according to the present invention when the null value collates high.

FIG. 11 is a flowchart that illustrates the steps required for transforming one-fetch queries according to the present invention when the null value collates high. Block 1102 is a decision block that determines if the query involves a GROUP BY operation on a derived table or a base table without any GROUP BY columns. If so, then control is transferred to block 1104. Otherwise, control is transferred to block 1106, which ends the routine and returns to FIG. 4.

Block 1104 is a decision block that determines if there is only one aggregation function MAX in the SELECT clause of the query. If so, then control is transferred to block 1108. Otherwise, control is transferred to block 1106.

Block 1108 is a decision block that determines if the column in the aggregate function MAX has a descending index with a null value as the highest collating value. If so, then control is transferred to block 1110. Otherwise, control is transferred to block 1106.

Block 1110 is a decision block that determines if the column in the aggregate function MAX is nullable. If so, then control is transferred to block 1112. Otherwise, control is transferred to block 1106.

Block 1112 generates a new predicate (as a Boolean factor) for the column of the form "COLUMN IS NOT NULL" in the WHERE clause of the query.

Figure 12:
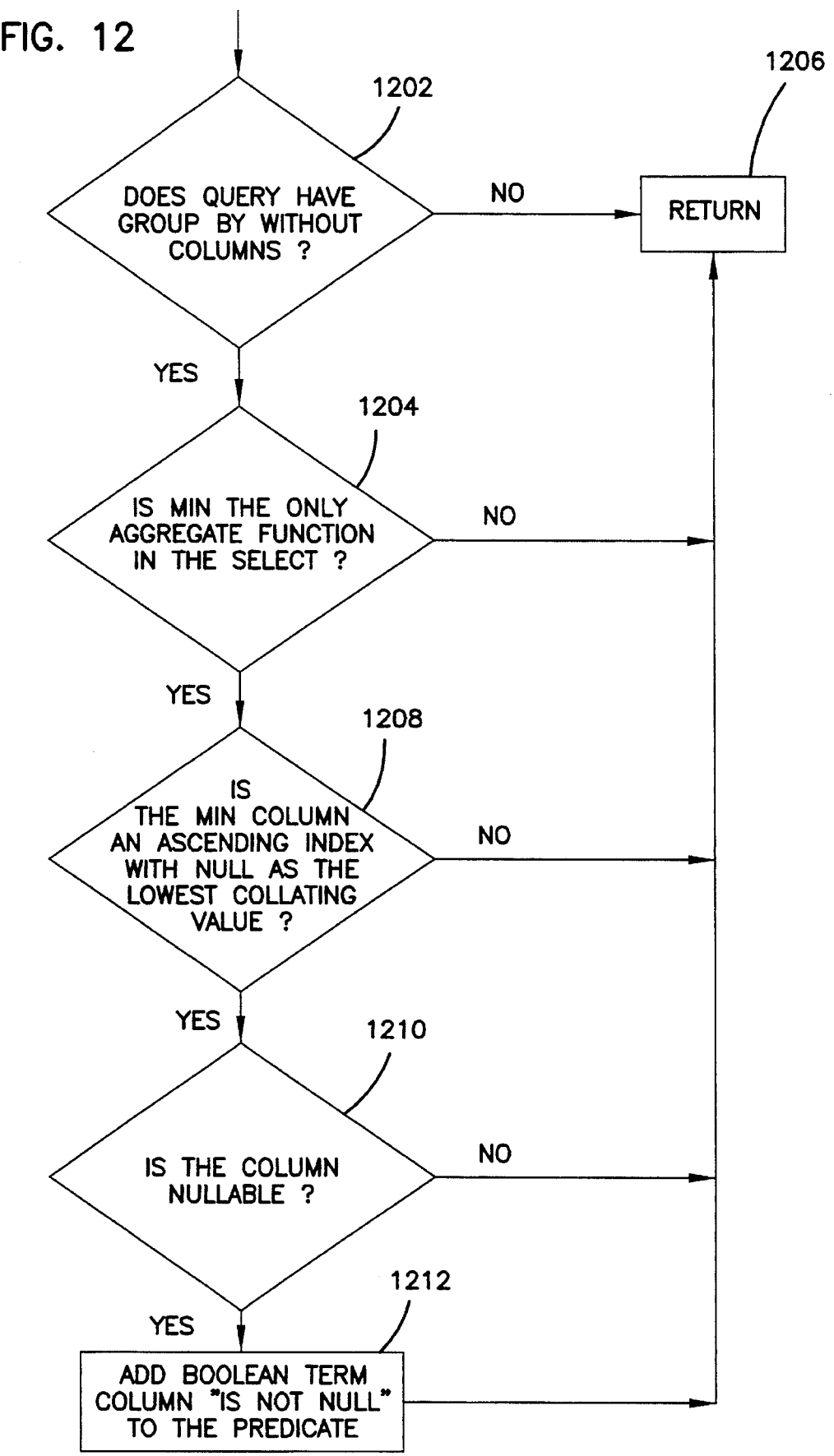
FIG. 12 is a flowchart that illustrates the steps required for transforming one-fetch queries according to the present invention when the null value collates low.

FIG. 12 is a flowchart that illustrates the steps required for transforming one-fetch queries according to the present invention when the null value collates low. Block 1202 is a decision block that determines if the query involves a GROUP BY operation on a derived table or a base table without any GROUP BY columns. If so, then control is transferred to block 1204. Otherwise, control is transferred to block 1206, which ends the routine and returns to FIG. 4.

Block 1204 is a decision block that determines if there is only one aggregation function MIN in the SELECT clause of the query. If so, then control is transferred to block 1208. Otherwise, control is transferred to block 1206.

Block 1208 is a decision block that determines if the column in the aggregate function MIN has an ascending index with a null value as the lowest collating value. If so, then control is transferred to block 1210. Otherwise, control is transferred to block 1206.

Block 1210 is a decision block that determines if the column in the aggregate function MIN is nullable. If so, then control is transferred to block 1212. Otherwise, control is transferred to block 1206.

Block 1212 generates a new predicate (as a Boolean factor) for the column of the form "COLUMN IS NOT NULL" in the WHERE clause of the query.

INTERSECT-TO-JOIN TRANSFORMATION

It has been pointed out in [PIRA92], incorporated by reference herein, that an intersect-distinct query can be transformed into a join via a sequence of query rewrite transformations. For example, suppose there are two tables, T and S, and an intersect-distinct query is applied against the tables as follows:
SELECT C1 FROM T
INTERSECT DISTINCT
SELECT C2 FROM S The techniques discussed in [PIRA92], incorporated by reference herein, transform the above intersect-distinct query into:
SELECT DISTINCT C1
FROM T, S
WHERE T.C1=S.C2

Unfortunately, these transformations are invalid in presence of null values, because the equality predicate in the WHERE clause is false in the presence of null values, whereas the INTERSECT query provides that a null value equals a null value. That is, without the presence of a variant of the equality predicate "=" where null equals null, the INTERSECT query cannot be transformed into a join. Because of this reason, determining column nullability becomes more important.

Figure 13:
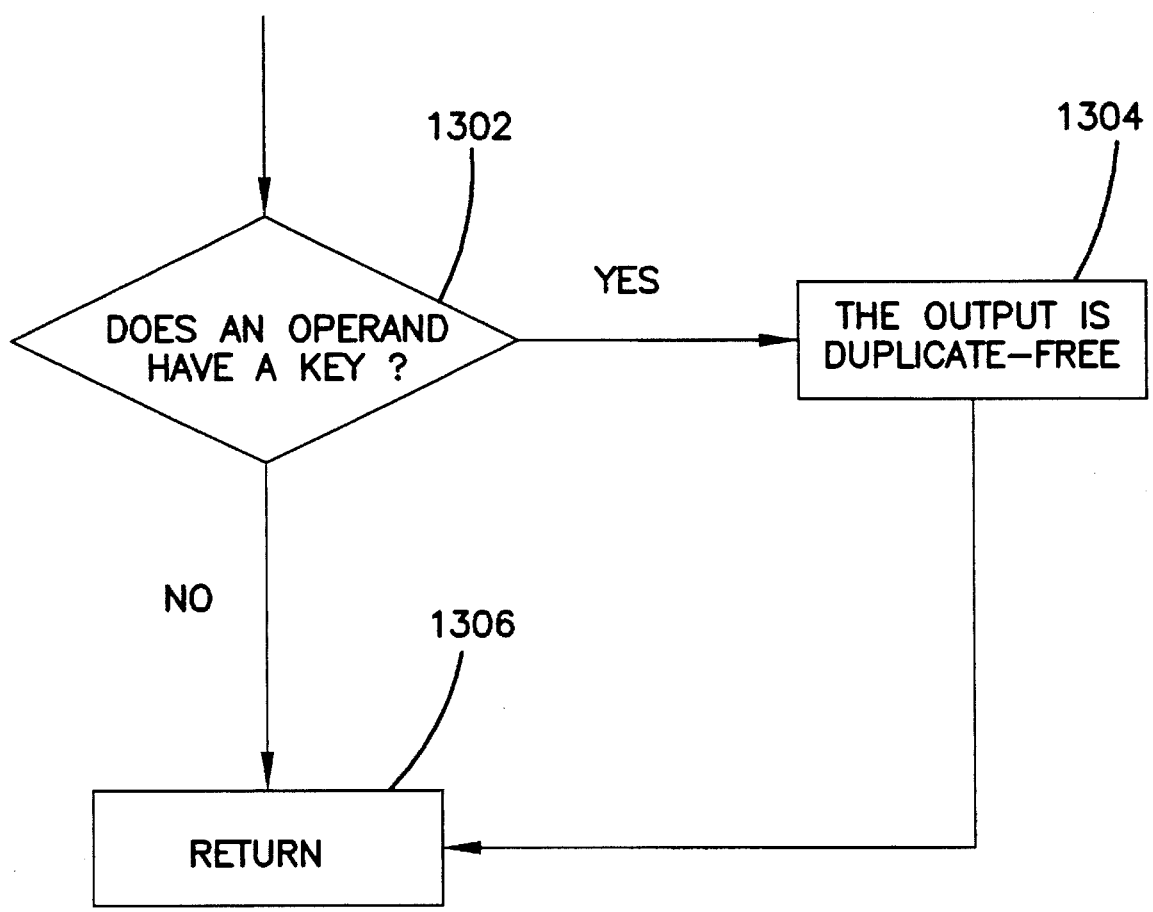
FIG. 13 is a flowchart that illustrates the steps required for transforming INTERSECT-ALL queries according to the present invention that determines if the output of an INTERSECT-ALL query is distinct, i.e., if the output is duplicate-free.

FIG. 13 is a flowchart that illustrates the steps required for transforming INTERSECT-ALL queries according to the present invention by determining if the output of an INTERSECT-ALL query is distinct, i.e., if the output is duplicate-free. Block 1302 is a decision block that determines if any column of an operand forms a key, wherein the key is a minimal set of columns that can uniquely determine a tuple in the base or derived table. If so, then control is transferred to block 1304, which identifies the output column as being duplicate-free, i.e., "head.distinct=IS". Otherwise, control is transferred to block 1306, which ends the routine and returns to FIG. 4.

For example, suppose the following tables, index and query are provided:

```
CREATE TABLE T (C1 INTEGER)
CREATE TABLE S (C2 INTEGER)
CREATE UNIQUE INDEX I ON T(C1)
SELECT C1 FROM T
INTERSECT ALL
SELECT C2 FROM S
```

The output of the above INTERSECT-ALL query is guaranteed to be duplicate-free, because of the unique index on T.C1. Note that the transformed query cannot be written using a valid SQL syntax, although its QGM representation is valid.

Figure 14:
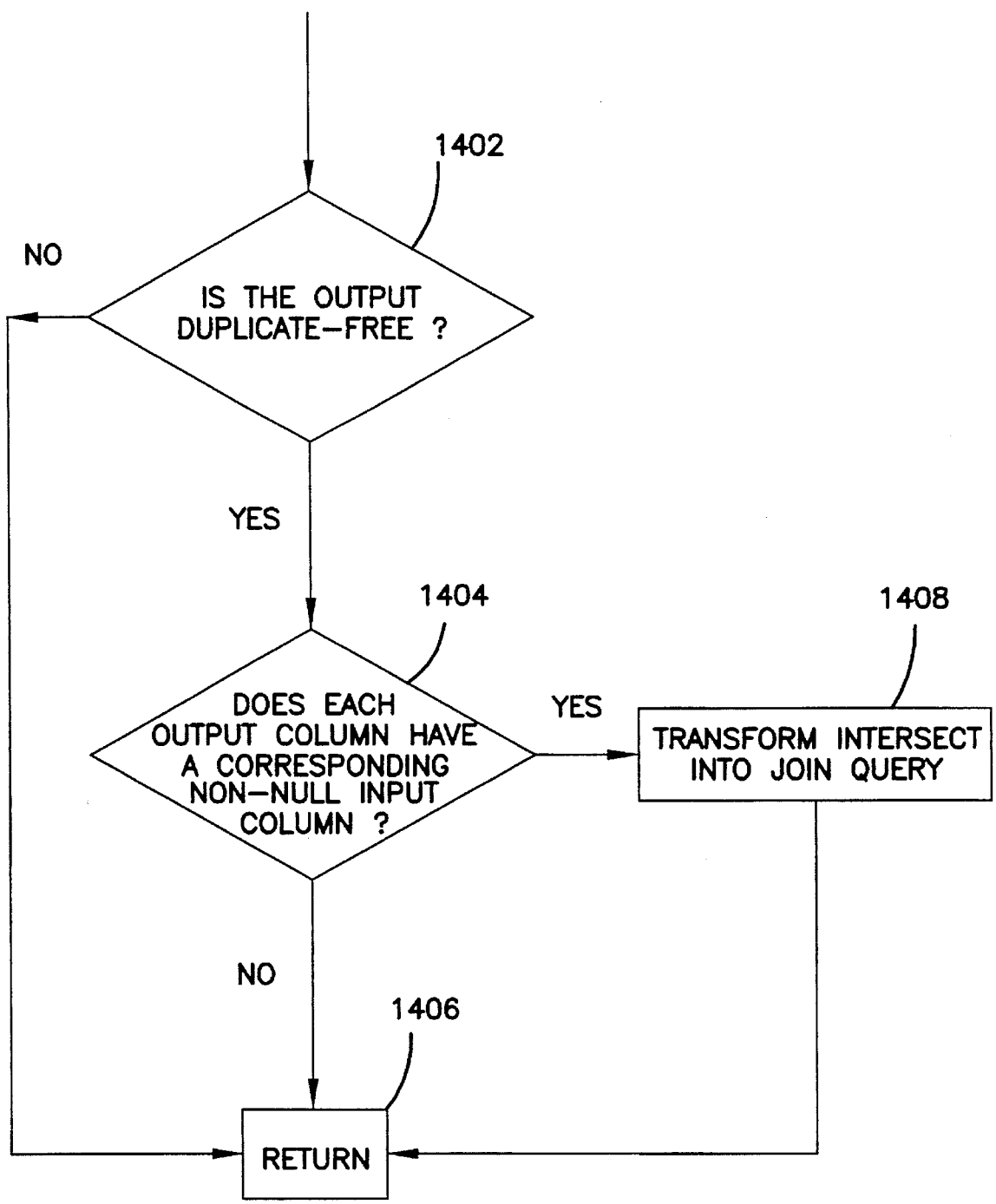
FIG. 14 is a flowchart that illustrates the steps required for performing intersect-to-join query transformations (which does not rely on a "null=null" operator in the WHERE clause).

FIG. 14 is a flowchart that illustrates the steps required for performing intersect-to-join query transformations (which do not rely on a "null=null" operator in the WHERE clause). Block 1402 is a decision block that determines if the output of an INTERSECT query is duplicate-free. If so, the control is transferred to block 1404. Otherwise, control is transferred to block 1406, which ends the routine and returns to FIG. 4. Block 1404 is a decision block that determines, for each output column, if at least one of its corresponding input columns is non-null. If so, then control is transferred to block 1408, which transforms the INTERSECT query into a join query (i.e., SELECT-FROM-WHERE). Otherwise, control is transferred to block 1406.

An example of this transformation is provided below. First, the tables T and S are defined:
```
CREATE TABLE T (C1 INTEGER NOT NULL, C2 INTEGER)
CREATE TABLE S (C1 INTEGER, C2 INTEGER)
```
A first example query against T and S follows:
```
SELECT C1 FROM T
INTERSECT DISTINCT
SELECT C1 FROM S
```
A second example query against T and S follows:
```
SELECT C2 FROM T
INTERSECT DISTINCT
SELECT C2 FROM S
```
The first example query can be transformed into a join, because column C1 from table T is non-null. However, the second example query cannot be transformed into a join, because all input columns are nullable.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method and apparatus for optimizing SQL queries by propagating and exploiting column nullability. The present invention identifies and propagates column nullability using a three-valued logic, wherein a column of a derived or base table can be null (when all data values in the column are null), non-null (when the column does not contain any null values), or nullable (when the column may or may not contain null values). The column nullability information is propagated through intermediate evaluations of SQL queries (e.g., selection, projection, join, intersection, except, union and group by operations). The present invention exploits the column nullability information to optimize query operations through transformations, and thus significantly enhance query evaluation performance. In one aspect of the present invention, quantified predicates (such as ">ALL") are transformed into simple predicates involving singleton subqueries so that indexing can be exploited during plan optimization. In another aspect of the present invention, "is not null" predicates are generated and pushed for certain aggregate queries. In still another aspect of the present invention, INTERSECT operations are transformed into joins, wherein the transformation does not rely on the use of any variant of the equality "=" operator that deals with null values. The end result is that query execution plans produced using the present invention can significantly enhance the performance of the queries.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing an SQL query in a computer having a memory, the SQL query being performed by the computer to retrieve data from a relational database stored in an electronic storage device coupled to the computer, the method comprising the steps of:
   (a) propagating column nullability values in the memory of the computer through various SQL operations of the query, wherein the column nullability values are selected from a group comprising null, non-null, and nullable; and
   (b) optimizing the SQL operations of the query in the memory of the computer based on the propagated column nullability values.

2. The method of claim 1 above, further comprising the step of translating the query into a query graph model.

3. The method of claim 1 above, further comprising the step of executing the SQL query against the relational database and outputting a result table to the user.

4. The method of claim 1 above, wherein the optimizing step comprises the steps of:
   (1) examining the query in the memory of the computer to determine whether it contains a universal quantified predicate between an outer column and an inner column returned by a subquery;
   (2) examining the query in the memory of the computer to determine nullability values for the outer and inner columns;
   (3) creating a derived table in the memory of the computer representing one or more boundary values for the inner column and the nullability value for the inner column, wherein the boundary values are selected from a group comprising a maximum value and a minimum value returned from the subquery, and wherein the derived table contains only one tuple; and
   (4) transforming the query in the memory of the computer using the derived table to replace the universal quantified predicate with a simple predicate containing the outer column and columns of the derived table.

5. The method of claim 4 above, further comprising the step of accessing the outer column using an index when there is an index on the outer column.

6. The method of claim 4 above, wherein the universal quantified predicate comprises a relational operator combined with an "ALL" keyword.

7. The method of claim 4 above, wherein the relational operator is selected from a group comprising =, >, <, <=, and >=.

8. The method of claim 4 above, wherein the transforming step further comprises the step of replacing the universal quantified predicate with a first simple predicate involving a singleton subquery when both the inner and outer columns are nullable.

9. The method of claim 4 above, wherein the transforming step further comprises the step of replacing the universal quantified predicate with a second simple predicate involving a singleton subquery when the inner column is nullable and the outer column is non-null.

10. The method of claim 4 above, wherein the simple predicate comprises one or more predicates comparing the outer column to the boundary values for the inner column and the nullability value for the inner column.

11. A method of optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether it contains a universal quantified predicate between an outer column and an inner column returned by a subquery;

(b) examining the query in the memory of the computer to determine nullability values for the outer and inner columns, wherein the nullability values are selected from a group comprising null, non-null, and nullable;

(c) creating a derived table in the memory of the computer representing one or more boundary values for the inner column and the nullability value for the inner column, wherein the boundary values are selected from a group comprising a maximum value and a minimum value returned from the subquery, and wherein the derived table contains only one tuple; and (d) transforming the query in the memory of the computer using the derived table to replace the universal quantified predicate with a simple predicate involving a singleton subquery containing the outer column and columns of the derived table.

12. The method of claim 11 above, further comprising the step of accessing the outer column using an index when there is an index on the outer column.

13. The method of claim 11 above, wherein the universal quantified predicate comprises a relational operator combined with an "ALL" keyword.

14. The method of claim 11 above, wherein the relational operator is selected from a group comprising =, >, <, <=, and >=.

15. The method of claim 11 above, wherein the transforming step further comprises the step of replacing the universal quantified predicate with a first simple predicate involving a singleton subquery when both the inner and outer columns are nullable.

16. The method of claim 11 above, wherein the transforming step further comprises the step of replacing the universal quantified predicate with a second simple predicate involving a singleton subquery when the inner column is nullable and the outer column is non-null.

17. The method of claim 11 above, wherein the simple predicate comprises one or more predicates comparing the outer column to the boundary values for the inner column and the nullability value for the inner column.

18. The method of claim 11 above, further comprising the step of propagating column nullability values through various SQL operations of the query.

19. A method of optimizing an SQL query in a computer having a memory, the SQL query being performed by the computer to retrieve data from a relational database stored in an electronic storage device coupled to the computer, the method comprising the steps of:

(a) examining the query in the memory of the computer to determine: (1) whether the query contains a GROUP BY operation on a table without any GROUP BY columns, (2) whether the query contains only a MAX aggregation function in a SELECT clause of the query, (3) whether a column referenced in the MAX aggregation function has a descending index with a null value as a highest collating value, and (4) whether the column referenced in the MAX aggregation function is nullable; and (b) transforming the query in the memory of the computer to include a new predicate for the column as a Boolean factor in a WHERE clause when the query contains the GROUP BY operation on the table without any GROUP BY columns, the query contains only the MAX aggregation function in the SELECT clause, the column referenced in the MAX aggregation function has a descending index with a null value as a highest collating value, and the column referenced in the MAX aggregation function is nullable, wherein the new predicate is of the form "COLUMN IS NOT NULL."

20. A method of optimizing an SQL query in a computer having a memory, the SQL query being performed by the computer to retrieve data from a relational database stored in an electronic storage device coupled to the computer, the method comprising the steps of:

(a) examining the query in the memory of the computer to determine: (1) whether the query contains a GROUP BY operation on a table without any GROUP BY columns, (2) whether the query contains only a MIN aggregation function in a SELECT clause of the query, (3) whether a column referenced in the MIN aggregation function has an ascending index with a null value as a lowest collating value, and (4) whether the column referenced in the MIN aggregation function is nullable; and (b) transforming the query in the memory of the computer to include a new predicate for the column as a Boolean factor in a WHERE clause when the query contains the GROUP BY operation on the table without any GROUP BY columns, the query contains only the MIN aggregation function in the SELECT clause, the column referenced in the MIN aggregation function has an ascending index with a null value as a lowest collating value, and the column referenced in the MIN aggregation function is nullable, wherein the new predicate is of the form "COLUMN IS NOT NULL."

21. A method of optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether the query contains an INTERSECT operation and whether an output of the query is distinct;

(b) examining the query in the memory of the computer to determine whether each output column of the query has at least one of its corresponding input columns being non-null; and (c) transforming the query in the memory of the computer by replacing the INTERSECT operation with a join query when the query contains an INTERSECT operation, the output of the query is distinct, and each output column of the query has at least one of its corresponding input columns being non-null.

22. The method of claim 21, wherein the examining step (a) further comprises the step of:
   (1) examining the query in the memory of the computer to determine whether any operands of the INTERSECT operation has a key; and
   (2) identifying an output of the query as distinct when one of the operands of the INTERSECT operation has a key.

23. An apparatus for optimizing an SQL query, comprising:
   (a) a computer having a memory and an electronic storage device coupled thereto, the data storage device storing a relational database;
   (b) means, performed by the computer, for accepting the SQL query into the memory of the computer, the SQL query being performed by the computer to retrieve data from a relational database stored in the computer;
   (c) means, performed by the computer, for propagating column nullability values in the memory of the computer through various SQL operations of the query, wherein the column nullability values are selected from a group comprising null, non-null, and nullable; and
   (d) means, performed by the computer, for optimizing the SQL operations of the query in the memory of the computer based on the propagated column nullability values.

24. An apparatus for optimizing an SQL query, comprising:
   (a) a computer having a memory and an electronic storage device coupled thereto, the data storage device storing a relational database;
   (b) means, performed by the computer, for accepting the SQL query into the memory of the computer, the SQL query being performed by the computer to retrieve data from a relational database stored in the computer;
   (c) means, performed by the computer, for examining the query in the memory of the computer to determine whether it contains a universal quantified predicate between an outer column and an inner column returned by a subquery;
   (d) means, performed by the computer, for examining the query in the memory of the computer to determine nullability values for the outer and inner columns, wherein the nullability values are selected from a group comprising null, non-null, and nullable;
   (e) means, performed by the computer, for creating a derived table in the memory of the computer representing one or more boundary values for the inner column and the nullability value for the inner column, wherein the boundary values are selected from a group comprising a maximum value and a minimum value returned from the subquery, and wherein the derived table contains only one tuple; and
   (f) means, performed by the computer, for transforming the query in the memory of the computer using the derived table to replace the universal quantified predicate with a simple predicate involving a singleton subquery containing the outer column and columns of the derived table.

25. The apparatus of claim 24 above, further comprising means for accessing the outer column using an index when there is an index on the outer column.

26. The apparatus of claim 24 above, wherein the means for transforming further comprises means for replacing the universal quantified predicate with a first simple predicate involving a singleton subquery when both the inner and outer columns are nullable.

27. The apparatus of claim 24 above, wherein the means for transforming further comprises means for replacing the universal quantified predicate with a second simple predicate involving a singleton subquery when the inner column is nullable and the outer column is non-null.

28. The apparatus of claim 22 above, wherein the simple predicate comprises one or more predicates comparing the outer column to the boundary values for the inner column and the nullability value for the inner column.

29. The apparatus of claim 24 above, further comprising means for propagating column nullability values through various SQL operations of the query.

30. An apparatus for optimizing an SQL query, comprising:
   (a) a computer having a memory and an electronic storage device coupled thereto, the data storage device storing a relational database;
   (b) means, performed by the computer, for accepting the SQL query into the memory of the computer, the SQL query being performed by the computer to retrieve data from a relational database stored in the computer;
   (c) means, performed by the computer, for examining the query in the memory of the computer to determine: (1) whether the query contains a GROUP BY operation on a table without any GROUP BY columns, (2) whether the query contains only a MAX aggregation function in a SELECT clause of the query, (3) whether a column referenced in the MAX aggregation function has a descending index with a null value as a highest collating value, and (4) whether the column referenced in the MAX aggregation function is nullable; and
   (d) means, performed by the computer, for transforming the query in the memory of the computer to include a new predicate for the column as a Boolean factor in a WHERE clause when the query contains the GROUP BY operation on the table without any GROUP BY columns, the query contains only the MAX aggregation function in the SELECT clause, the column referenced in the MAX aggregation function has a descending index with a null value as a highest collating value, and the column referenced in the MAX aggregation function is nullable, wherein the new predicate is of the form "COLUMN IS NOT NULL."

31. An apparatus for optimizing an SQL query, comprising:
   (a) a computer having a memory and an electronic storage device coupled thereto, the data storage device storing a relational database;
   (b) means, performed by the computer, for accepting the SQL query into the memory of the computer, the SQL query being performed by the computer to retrieve data from a relational database stored in the computer;
   (c) means, performed by the computer, for examining the query in the memory of the computer to determine: (1) whether the query contains a GROUP BY operation on a table without any GROUP BY columns, (2) whether the query contains only a MIN aggregation function in a SELECT clause of the query, (3) whether a column referenced in the MIN aggregation function has an ascending index with a null value as a lowest collating value, and (4) whether the column referenced in the MIN aggregation function is nullable; and
   (d) means, performed by the computer, for transforming the query in the memory of the computer to include a new predicate for the column as a Boolean factor in a WHERE clause when the query contains the GROUP BY operation on the table without any GROUP BY columns, the query contains only the MIN aggregation function in the SELECT clause, the column referenced in the MIN aggregation function has an ascending index with a null value as a lowest collating value, and the column referenced in the MIN aggregation function is nullable, wherein the new predicate is of the form "COLUMN IS NOT NULL."

32. An apparatus for optimizing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for examining the query in the memory of the computer to determine whether the query contains an INTERSECT operation and whether an output of the query is distinct;

(d) means, performed by the computer, for examining the query in the memory of the computer to determine whether each output column of the query has at least one of its corresponding input columns being non-null; and (e) means, performed by the computer, for transforming the query in the memory of the computer by replacing the INTERSECT operation with a join query when the query contains an INTERSECT operation, the output of the query is distinct, and each output column of the query has at least one of its corresponding input columns being non-null.

33. The apparatus of claim 32, wherein the means for examining (c) further comprises:

(1) means for examining the query in the memory of the computer to determine whether any operands of the INTERSECT operation has a key; and (2) means for identifying an output of the query as distinct when one of the operands of the INTERSECT operation has a key.

34. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) propagating column nullability values in the memory of the computer through various SQL operations of the query, wherein the column nullability values are selected from a group comprising null, non-null, and nullable; and (b) optimizing the SQL operations of the query in the memory of the computer based on the propagated column nullability values.

35. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether it contains a universal quantified predicate between an outer column and an inner column returned by a subquery;

(b) examining the query in the memory of the computer to determine nullability values for the outer and inner columns, wherein the nullability values are selected from a group comprising null, non-null, and nullable;

(c) creating a derived table in the memory of the computer representing one or more boundary values for the inner column and the nullability value for the inner column, wherein the boundary values are selected from a group comprising a maximum value and a minimum value returned from the subquery, and wherein the derived table contains only one tuple; and (d) transforming the query in the memory of the computer using the derived table to replace the universal quantified predicate with a simple predicate involving a singleton subquery containing the outer column and columns of the derived table.

36. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine: (1) whether the query contains a GROUP BY operation on a table without any GROUP BY columns, (2) whether the query contains only a MAX aggregation function in a SELECT clause of the query, (3) whether a column referenced in the MAX aggregation function has a descending index with a null value as a highest collating value, and (4) whether the column referenced in the MAX aggregation function is nullable; and (b) transforming the query in the memory of the computer to include a new predicate involving the column as a Boolean factor in a WHERE clause when the query contains the GROUP BY operation on the table without any GROUP BY columns, the query contains only the MAX aggregation function in the SELECT clause, the column referenced in the MAX aggregation function has a descending index with a null value as a highest collating value, and the column referenced in the MAX aggregation function is nullable, wherein the new predicate is of the form "COLUMN IS NOT NULL."

37. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine: (1) whether the query contains a GROUP BY operation on a table without any GROUP BY columns, (2) whether the query contains only a MIN aggregation function in a SELECT clause of the query, (3) whether a column referenced in the MIN aggregation function has an ascending index with a null value as a lowest collating value, and (4) whether the column referenced in the MIN aggregation function is nullable; and (b) transforming the query in the memory of the computer to include a new predicate for the column as a Boolean factor in a WHERE clause when the query contains the GROUP BY operation on the table without any GROUP BY columns, the query contains only the MIN aggregation function in the SELECT clause, the column referenced in the MIN aggregation function has an ascending index with a null value as a lowest collating value, and the column referenced in the MIN aggregation function is nullable, wherein the new predicate is of the form "COLUMN IS NOT NULL."

38. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether the query contains an INTERSECT operation and whether an output of the query is distinct;

(b) examining the query in the memory of the computer to determine whether each output column of the query has at least one of its corresponding input columns being non-null; and (c) transforming the query in the memory of the computer by replacing the INTERSECT operation with a join query when the query contains an INTERSECT operation, the output of the query is distinct, and each output column of the query has at least one of its corresponding input columns being non-null.

* * * * *

UNITED STATES PATENT AND TRADEMARK OFFICE
CERTIFICATE OF CORRECTION

PATENT NO. : 5,590,324

DATED : December 31, 1996

INVENTOR(S) : Leung et al.

It is certified that error appears in the above-identified patent and that said Letters Patent is hereby corrected as shown below:

[57] Abstract, 4th line, after "identfiied" and before "nullability", please insert --as being null, non-null or nullable. The column---.

Column 16, line 19, please delete "Z" and insert --Y--.

Column 24, line 9, please delete "22" and insert --24--.

Signed and Sealed this

Eighth Day of July, 1997

*Attest:*

BRUCE LEHMAN

*Attesting Officer*     *Commissioner of Patents and Trademarks*